United States Patent
Nichols et al.

(10) Patent No.: US 11,481,930 B2
(45) Date of Patent: Oct. 25, 2022

(54) ACCURATELY POSITIONING AUGMENTED REALITY MODELS WITHIN IMAGES

(71) Applicant: Trimble Inc., Sunnyvale, CA (US)

(72) Inventors: Mark Nichols, Christchurch (NZ); Darrin Hurd, Christchurch (NZ); Hyungon Kim, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 16/748,042

(22) Filed: Jan. 21, 2020

(65) Prior Publication Data

US 2021/0225041 A1     Jul. 22, 2021

(51) Int. Cl.
*G06T 11/00* (2006.01)
*G06T 7/70* (2017.01)
*G01B 21/16* (2006.01)

(52) U.S. Cl.
CPC .............. *G06T 11/00* (2013.01); *G01B 21/16* (2013.01); *G06T 7/70* (2017.01)

(58) Field of Classification Search
CPC ....... G06T 7/70; G06T 11/00; G06T 2210/04; G06T 19/006; G01B 21/16
See application file for complete search history.

(56) References Cited

U.S. PATENT DOCUMENTS

| | | | |
|---|---|---|---|
| 9,761,045 B1* | 9/2017 | Cote | G06T 15/30 |
| 10,432,888 B2 | 10/2019 | Hurd et al. | |
| 10,755,483 B1* | 8/2020 | Cote | G06T 15/04 |
| 2006/0268261 A1* | 11/2006 | Chien | G01S 7/48 356/139.1 |
| 2012/0249416 A1 | 10/2012 | Maciocci et al. | |
| 2015/0172626 A1* | 6/2015 | Martini | G06T 17/05 348/50 |
| 2015/0193980 A1* | 7/2015 | Pedley | G06T 19/006 345/419 |
| 2019/0065027 A1* | 2/2019 | Hauenstein | G06F 3/04883 |
| 2019/0110016 A1 | 4/2019 | Hurd et al. | |
| 2019/0147619 A1* | 5/2019 | Goldman | B64C 39/024 382/154 |

(Continued)

FOREIGN PATENT DOCUMENTS

| | | |
|---|---|---|
| EP | 3 467 787 A1 | 4/2019 |
| WO | 2019/048866 A1 | 3/2019 |
| WO | 2020/006299 A1 | 1/2020 |

OTHER PUBLICATIONS

Arnaud, A. et al., "On the Fly Plane Detection and Time Consistency for Indoor Building Wall Recognition Using a Table Equipped With a Depth Sensor," IEEE Access, vol. 6, 2018, pp. 17643-17652.

(Continued)

*Primary Examiner* — Ryan R Yang
(74) *Attorney, Agent, or Firm* — Kilpatrick Townsend and Stockton LLP

(57) ABSTRACT

A method for positioning an augmented reality (AR) model of a building or area of construction relative to an image of the building or area of construction as displayed on a handheld device. The AR model is positioned so that vertical surfaces of the AR model are aligned with vertical surfaces of the building or area of construction and a horizontal surface of the AR model is aligned with an associated horizontal surface of the building or area of construction.

20 Claims, 24 Drawing Sheets

(56) References Cited

U.S. PATENT DOCUMENTS

2019/0304128 A1\* 10/2019 Myeong .................... G06T 7/97
2020/0082633 A1\* 3/2020 Rom ....................... G06T 17/10
2020/0286289 A1\* 9/2020 Mitchell ............ G02B 27/0093
2020/0327738 A1\* 10/2020 Jurgenson .......... G06K 9/00624
2020/0334882 A1\* 10/2020 Chang .................... G06F 3/014

OTHER PUBLICATIONS

Extended European Search Report for Application No. 21151338.7-12360, dated Jun. 21, 2021, 12 pages.
Kim, H. et al., "IMAF: in situ indoor modeling and annotation framework on mobile phones," Personal and Ubiquitous Computing, vol. 17, No. 3, Apr. 7, 2012, pp. 571-582.

\* cited by examiner

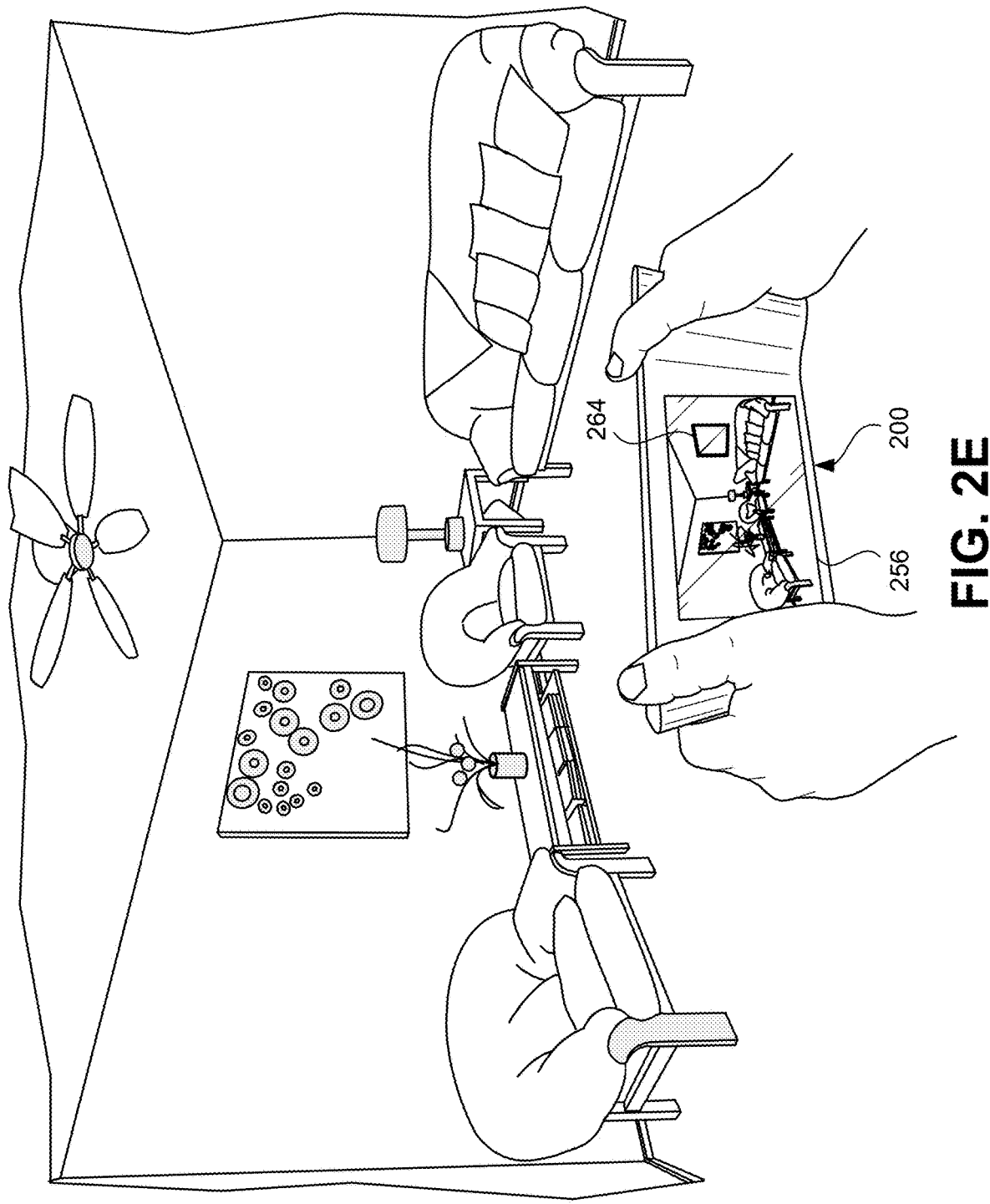

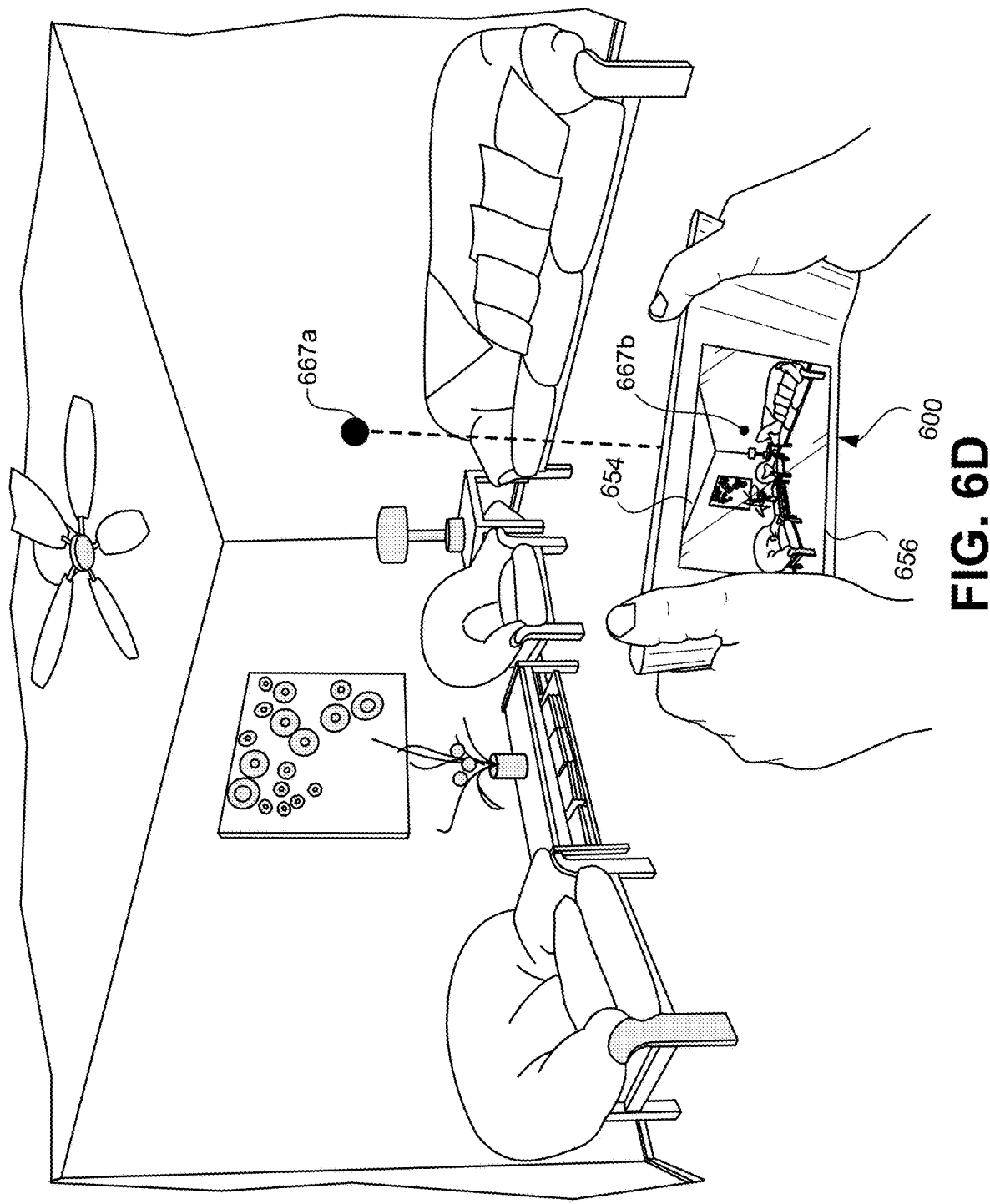

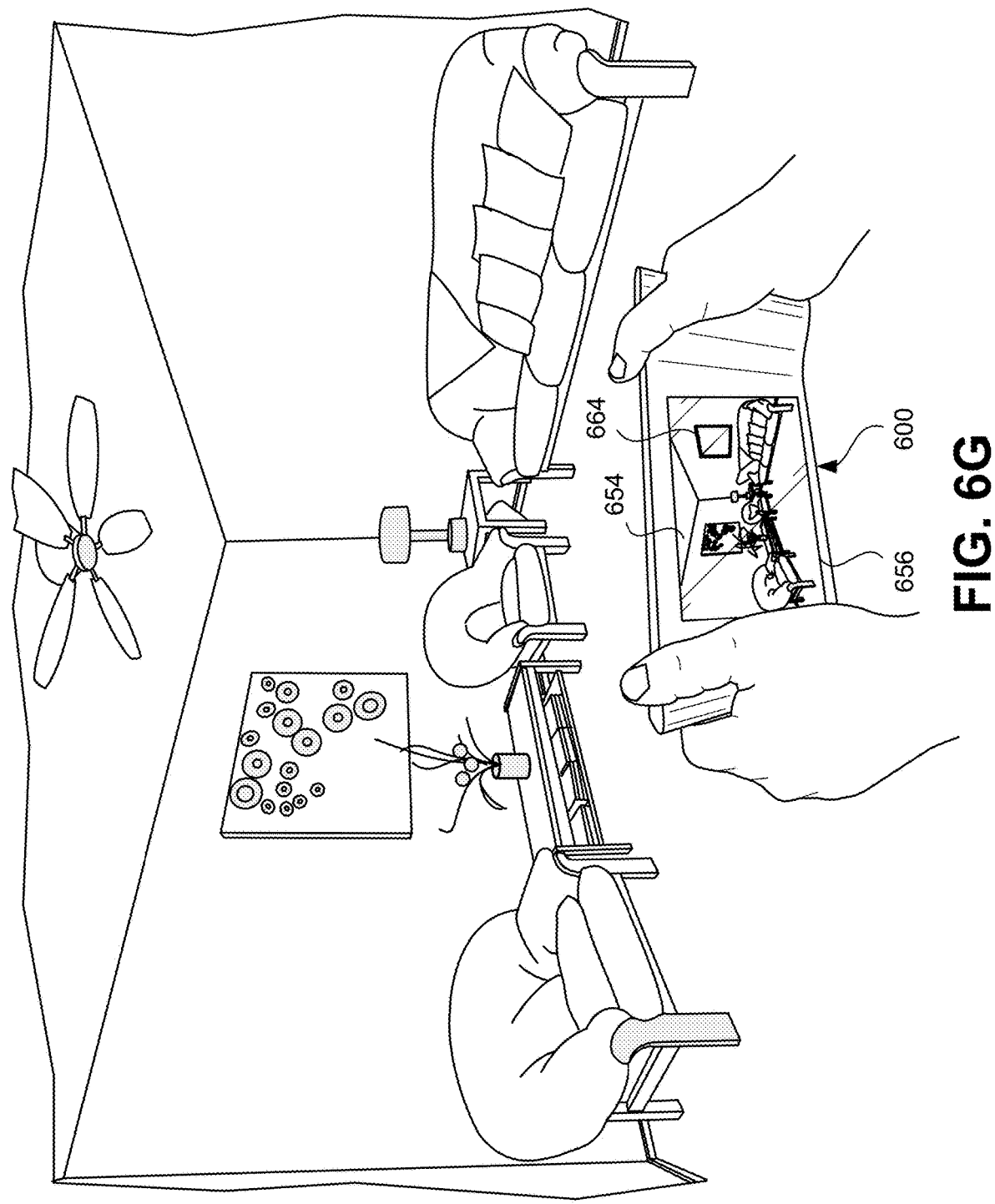

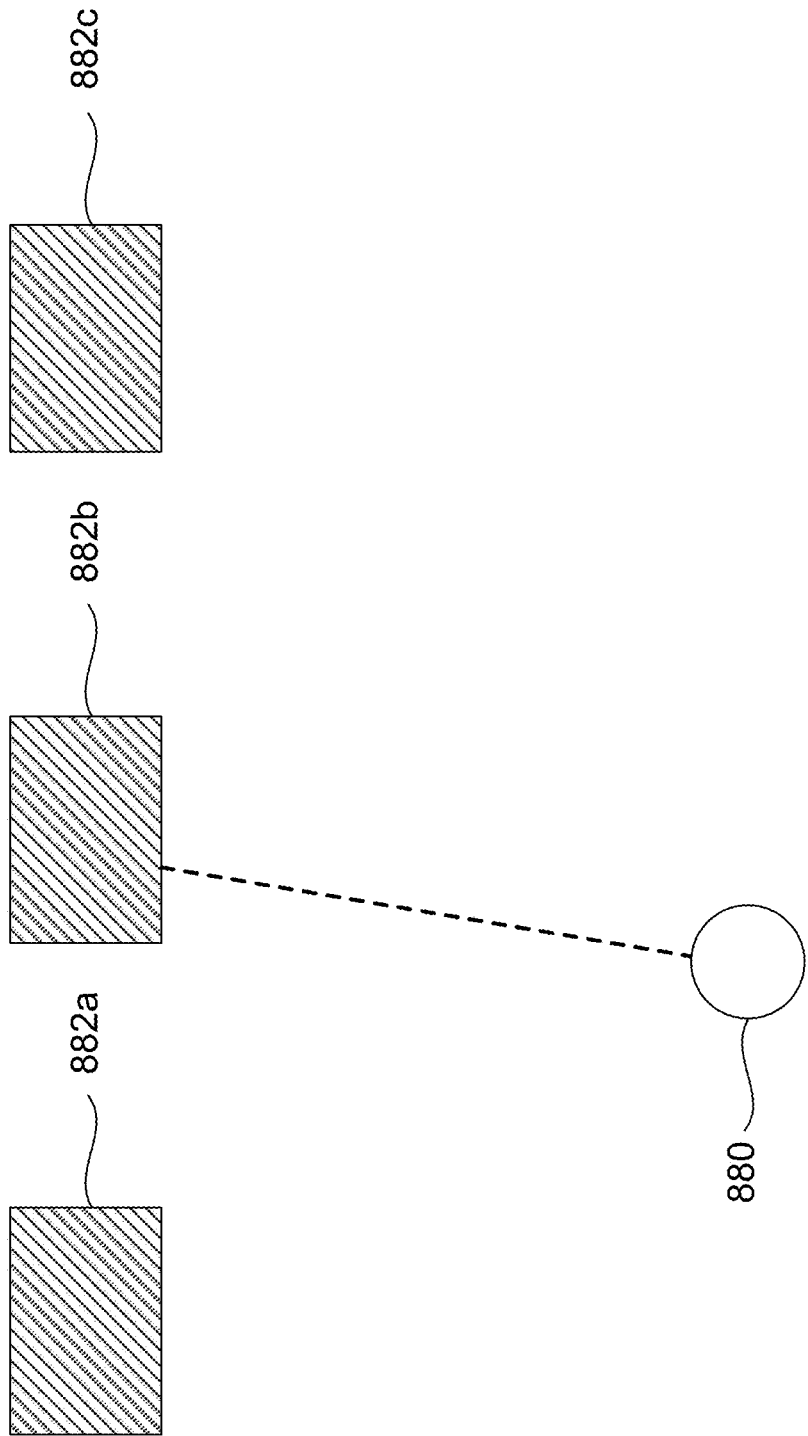

ACCURATELY POSITIONING AUGMENTED REALITY MODELS WITHIN IMAGES

FIELD

Embodiments described herein relate generally to positioning augmented reality (AR) models relative to corresponding objects in images and in the real world so that the AR models are displayed properly on displays of AR devices.

BACKGROUND

Some conventional AR devices use simultaneous localization and mapping (SLAM) or similar techniques to track their position and orientation. These techniques also track positions of surrounding objects by constructing and updating maps of the environment using image information. Positions of the AR models can be updated based on positions of objects that are recognized from the mapping process.

In some situations, such as within a building or during construction of a building, there may be many similar-looking objects that make mapping difficult. An example would be in a hotel where it may be difficult to distinguish one floor or room from another based on image information. AR devices may have trouble tracking their position in these environments because each floor and/or room may look alike. Some AR devices may use global navigation satellite system (GNSS) signals to improve positioning, but in situations where GNSS reception is poor and there are similar-looking objects, mapping may be difficult and the resulting accuracy may be inadequate. Thus, there is a need for improved systems and methods for accurately positioning AR models within images.

SUMMARY

Embodiments described herein provide improved systems and methods for positioning AR models relative to corresponding objects in images and in the real world. Some of the methods use distance measurements along with information about AR models to improve positioning. As an example, some embodiments measure distances between an AR device and objects in the surrounding environment. These distances, along with positions of the objects in the AR models, can be used to align the AR models with the objects in the images. Some embodiments also detect planes in the surrounding environment. A location and size of the planes, along with information about the corresponding planes in the AR models, can be used to align the AR models with the planes in the images.

In accordance with a particular embodiment, for example, a method for positioning an AR model of a building or area of construction relative to an image of the building or area of construction as displayed on a handheld device is provided. The method aligns vertical surfaces of the AR model with vertical surfaces of the building or area of construction and a horizontal surface of the AR model with an associated horizontal surface of the building or area of construction. The method includes identifying a first vertical surface of the building or area of construction, a second vertical surface of the building or area of construction, and the horizontal surface of the building or area of construction using a plane detection function of the handheld device. The AR model of the building or area of construction is selected on the handheld device. The method also includes identifying in the AR model: a first vertical surface in the AR model that corresponds to the first vertical surface of the building or area of construction, a second vertical surface in the AR model that corresponds to the second vertical surface of the building or area of construction, and a horizontal surface in the AR model that corresponds to the horizontal surface of the building or area of construction. A coordinate frame associated with the AR model is shifted so that the first vertical surface in the AR model accurately aligns with the first vertical surface of the building or area of construction in the image, the second vertical surface in the AR model accurately aligns with the second vertical surface of the building or area of construction in the image, and the horizontal surface of the AR model accurately aligns with the horizontal surface of the building or area of construction in the image.

In an embodiment, the image of the building or area of construction as displayed on the handheld device comprises a plurality of images obtained using a camera.

In another embodiment, the method also includes performing, using a distance measurement unit having a known spatial relationship with a camera of the handheld device, a first distance measurement from the handheld device to an object within the building or area of construction while the handheld device is at a first position and orientation; determining, in a coordinate frame associated with the building or area of construction, first coordinates of the object; identifying the object in the AR model using the first coordinates; and shifting the coordinate frame associated with the AR model so that the object in the AR model accurately aligns with the object in the image. In some embodiments, the object is identified in the AR model as being within a threshold distance of the first coordinates. In other embodiments, identifying the object in the AR model comprises: determining a horizontal distance between the first position of the handheld device and the first coordinates using the first distance measurement and the first position and orientation of the handheld device; and identifying objects in the AR model that are at the horizontal distance plus or minus a predetermined threshold distance from the first position of the handheld device. In yet other embodiments, identifying the object in the AR model comprises: determining a heading of the camera in the coordinate frame associated with the building or area of construction while the handheld device is at the first position and orientation; and identifying the object in the AR model based on the heading of the camera, the first distance measurement, and the first position and orientation of the handheld device.

In accordance with another embodiment, a method for positioning an AR model of a building or area of construction relative to an image of the building or area of construction as displayed on a handheld device is provided. The method aligns vertical surfaces of the AR model with vertical surfaces of the building or area of construction and a horizontal surface of the AR model with an associated horizontal surface of the building or area of construction. The method includes performing, using a distance measurement unit having a known spatial relationship with a camera of the handheld device: a first distance measurement from the handheld device to a first point on a first vertical surface of the building or area of construction; a second distance measurement from the handheld device to a second point on a second vertical surface of the building or area of construction, wherein the first vertical surface of the building or area of construction and the second vertical surface of the building or area of construction intersect at a right angle; and a third distance measurement from the handheld device to a third point on the associated horizontal surface of the building or area of construction. The method also includes selecting the AR model of the building or area of construction on the handheld device, and identifying in the AR model: a first vertical surface in the AR model that corresponds to the first vertical surface of the building or area of construction; a second vertical surface in the AR model that corresponds to the second vertical surface of the building or area of construction; and the horizontal surface in the AR model that corresponds to the associated horizontal surface of the building or area of construction. A coordinate frame associated with the AR model is shifted so that the first vertical surface in the AR model accurately aligns with the first vertical surface of the building or area of construction in the image, the second vertical surface in the AR model accurately aligns with the second vertical surface of the building or area of construction in the image, and the horizontal surface of the AR model accurately aligns with the associated horizontal surface of the building or area of construction in the image.

In an embodiment, the method also includes determining a first horizontal distance between the handheld device and the first point using the first distance measurement; determining a second horizontal distance between the handheld device and the second point using the second distance measurement; and determining a third vertical distance between the handheld device and the third point using the third distance measurement. The coordinate frame associated with the AR model is shifted using the first horizontal distance, the second horizontal distance, and the third vertical distance.

In another embodiment, the first distance measurement is obtained while the handheld device is at a first position and orientation, the second distance measurement is obtained while the handheld device is at a second position and orientation, and the third distance measurement is obtained while the handheld device is at a third position and orientation. Shifting the coordinate frame associated with the AR model so that the horizontal surface of the AR model accurately aligns with the associated horizontal surface of the building or area of construction in the image includes determining a vertical distance between the handheld device and the third point based on the third position and orientation of the handheld device.

In another embodiment, the first vertical surface in the AR model, the second vertical surface in the AR model, and the horizontal surface in the AR model are identified in the image based on user input.

In yet another embodiment, the method includes performing, using the distance measurement unit, a fourth distance measurement from the handheld device to an object within the building or area of construction while the handheld device is at a fourth position and orientation; determining, in a coordinate frame associated with the building or area of construction, fourth coordinates of the object; identifying the object in the AR model using the fourth coordinates; and shifting the coordinate frame associated with the AR model so that the object in the AR model accurately aligns with the object in the image. In some embodiments, the object is identified in the AR model as being within a threshold distance of the fourth coordinates. In other embodiments, identifying the object in the AR model comprises: determining a horizontal distance between the fourth position of the handheld device and the fourth coordinates using the fourth distance measurement and the fourth position and orientation of the handheld device; and identifying objects in the AR model that are at the horizontal distance plus or minus a predetermined threshold distance from the fourth position of the handheld device. In yet other embodiments, identifying the object in the AR model comprises: determining a heading of the camera in the coordinate frame associated with the building or area of construction while the handheld device is at the fourth position and orientation; and identifying the object in the AR model based on the heading of the camera, the fourth distance measurement, and the fourth position and orientation of the handheld device.

In accordance with another embodiment, a method for positioning an AR model of a building or area of construction relative to an image of the building or area of construction as displayed on a handheld device is provided. The method aligns vertical surfaces of the AR model with vertical surfaces of the building or area of construction and a horizontal surface of the AR model with an associated horizontal surface of the building or area of construction. The method includes selecting the AR model of the building or area of construction on the handheld device, and positioning the AR model of the building or area of construction relative to the building or area of construction displayed on the handheld device by: moving the AR model of the building or area of construction relative to the image of the building or area of construction so that the vertical surfaces of the AR model are located between a position of the handheld device and the vertical surfaces of the building or area of construction in the image, and the horizontal surface of the AR model is located between the position of the handheld device and the associated horizontal surface of the building or area of construction in the image; moving the AR model of the building or area of construction relative to the image of the building or area of construction so that the vertical surfaces of the AR model are located behind the vertical surfaces of the building or area of construction in the image, and the horizontal surface of the AR model is located under the associated horizontal surface of the building or area of construction in the image; or moving the AR model of the building or area of construction relative to the image of the building or area of construction so that at least a portion of the vertical surfaces of the AR model are located between a position of the handheld device and the vertical surfaces of the building or area of construction in the image, and/or at least a portion of the horizontal surface of the AR model is located between the position of the handheld device and the associated horizontal surface of the building or area of construction in the image. The method also includes performing, using a distance measurement unit having a known spatial relationship with a camera of the handheld device: a first distance measurement from the handheld device to a first point on a first vertical surface of the building or area of construction while the handheld device is at a first position and orientation; a second distance measurement from the handheld device to a second point on the first vertical surface of the building or area of construction while with the handheld device is at a second position and orientation; a third distance measurement from the handheld device to a third point on a second vertical surface of the building or area of construction while with the handheld device is at a third position and orientation; and a fourth distance measurement from the handheld device to fourth point on the associated horizontal surface of the building or area of construction while with the handheld device is at a fourth position and orientation. The method also includes determining, in a coordinate frame associated with the building or area of construction: first coordinates of the first point on the first vertical surface using the first position and orientation and the first distance measurement; second coordinates of the second point on the first vertical surface using the second position and orientation and the second distance measurement; third coordinates of the third point on the second vertical surface using the third position and orientation and the third distance measurement; and fourth coordinates of the fourth point on the associated horizontal surface using the fourth position and orientation and the fourth distance measurement. The method also includes determining, in a coordinate frame associated with the AR model: first coordinates of a first point in the AR model, the first point in the AR model located where a beam of the distance measurement unit intersects the AR model while performing the first distance measurement; second coordinates of a second point in the AR model, the second point in the AR model located where the beam of the distance measurement unit intersects the AR model while performing the second distance measurement; third coordinates of a third point in the AR model, the third point in the AR model located where the beam of the distance measurement unit intersects the AR model while performing the third distance measurement; and fourth coordinates of a fourth point in the AR model, the fourth point in the AR model located where the beam of the distance measurement unit intersects the AR model while performing the fourth distance measurement. A first plane associated with the first vertical surface is determined. The first plane associated with the first vertical surface is aligned approximately with a gravity vector and passes through the first coordinates of the first point on the first vertical surface and the second coordinates of the second point on the first vertical surface. A first plane associated with a first vertical surface in the AR model is determined. The first plane associated with the first vertical surface in the AR model is aligned approximately with the gravity vector and passes through the first coordinates of the first point in the AR model and the second coordinates of the second point in the AR model. The coordinate frame associated with the AR model is shifted so that the first plane associated with the first vertical surface in the AR model is accurately aligned with the first plane associated with the first vertical surface in the image. The third coordinates of the third point on the second vertical surface and the third coordinates of the third point in the AR model are used to shift the coordinate frame associated with the AR model so that a second vertical surface in the AR model is accurately aligned with the second vertical surface in the image. The fourth coordinates of the fourth point on the associated horizontal surface and the fourth coordinates of the fourth point in the AR model are used to shift the coordinate frame associated with the AR model so that a horizontal surface in the AR model is accurately aligned with the associated horizontal surface in the image.

In an embodiment, the image of the building or area of construction as displayed on the handheld device comprises a plurality of images obtained using the camera.

In another embodiment, the method includes performing, using the distance measurement unit, a fifth distance measurement from the handheld device to an object within the building or area of construction while the handheld device is at a fifth position and orientation; determining, in the coordinate frame associated with the building or area of construction, fifth coordinates of the object; identifying the object in the AR model using the fifth coordinates; and shifting the coordinate frame associated with the AR model so that the object in the AR model accurately aligns with the object in the image. In some embodiments, identifying the object in the AR model comprises: determining a horizontal distance between the fifth position of the handheld device and the fifth coordinates using the fifth distance measurement and the fifth position and orientation of the handheld device; and identifying objects in the AR model that are at the horizontal distance plus or minus a predetermined threshold distance from the fifth position of the handheld device. In other embodiments, identifying the object in the AR model comprises: determining a heading of the camera in the coordinate frame associated with the building or area of construction while the handheld device is at the fifth position and orientation; and identifying the object in the AR model based on the heading of the camera, the fifth distance measurement, and the fifth position and orientation of the handheld device.

In accordance with yet another embodiment, a method for positioning an AR model relative to an image of the model as displayed on a handheld device is provided. The method aligns objects in the AR model with objects in the real world and a ground or other surface of the AR model with the ground or other surface in the real world. The method includes measuring a first distance between the handheld device and a first object in the real world using a distance measurement function of the handheld device; determining a first horizontal distance to the first object in the real world based on an angle of the handheld device while measuring the first distance; selecting the first object in the AR model on the handheld device; moving the AR model within an AR reference frame to align the first object in the AR model with the first object measured in the real world; measuring a second distance between the handheld device and a second object in the real world using the distance measurement function of the handheld device; determining a second horizontal distance to the second object in the real world based on an angle of the handheld device while measuring the second distance; selecting the second object in the AR model on the handheld device; rotating the model to align the second object in the AR model with the second object measured in the real world; and making a measurement to a surface in the real world and raising or lowering the AR model so that the surface in the AR model aligns with the surface in the real world.

Embodiments of the present disclosure may include a non-transitory computer readable storage media comprising instructions to cause one or more processors within an AR device to perform operations comprising the described methods. Embodiments of the present disclosure may also include an AR device including a camera, display, distance measurement unit, and processor configured to perform the described methods.

BRIEF DESCRIPTION OF THE DRAWINGS

The accompanying drawings are included to provide a further understanding of the embodiments described herein. No attempt is made to show structural details in more detail than may be necessary for a fundamental understanding of the embodiments and various ways in which they may be practiced.

FIGS. 2A-2E are simplified drawings illustrating a method for positioning an AR model of a room relative to an image of the room as displayed on a handheld device, according to an embodiment of the present disclosure.

FIGS. 6A-6G are simplified drawings illustrating a method for positioning an AR model of a room relative to an image of the room as displayed on a handheld device, according to yet another embodiment of the present disclosure.

FIGS. 8A-8B are simplified drawings illustrating a method for updating a position of an AR model relative to surrounding objects, according to an embodiment of the present disclosure.

In the appended figures, similar components and/or features may have the same numerical reference label.

DETAILED DESCRIPTION

Embodiments of the present disclosure provide systems and methods for positioning AR models relative to corresponding objects in images and in the real world. Some of the methods use distance measurements along with information about AR models to improve positioning. As an example, in some embodiments, distances between an AR device and objects in the surrounding environment may be used to improve positioning. Improved positioning provides more accurate positioning of AR models relative to corresponding real world objects. The distances may be determined using a distance measurement unit such as an electronic distance measurement (EDM) unit and tilt sensors. The distance measurement unit may have a known spatial relationship with a camera of the AR device so that distances between the camera and the objects in the surrounding environment can be determined. The tilt sensors provide tilt information that can be used to determine a vertical angle of the AR device so that horizontal and vertical distances to surfaces can be determined. Heading can be determined from image tracking and/or inertial sensors.

As another example, some embodiments identify vertical and horizontal surfaces using a plane detection function of an AR device. A location and size of the surfaces may be used to improve positioning of an AR model relative to corresponding objects in an image and in the real world. A coordinate frame associated with the AR model may be shifted so that vertical and horizontal surfaces in the AR model are aligned with the corresponding surfaces in the image and in the real world.

As used herein, an AR device or handheld device may be portable electronic device, a mobile phone, a tablet, or other device configured to perform some or all of the steps of the methods provided by various embodiments.

Figure 1:
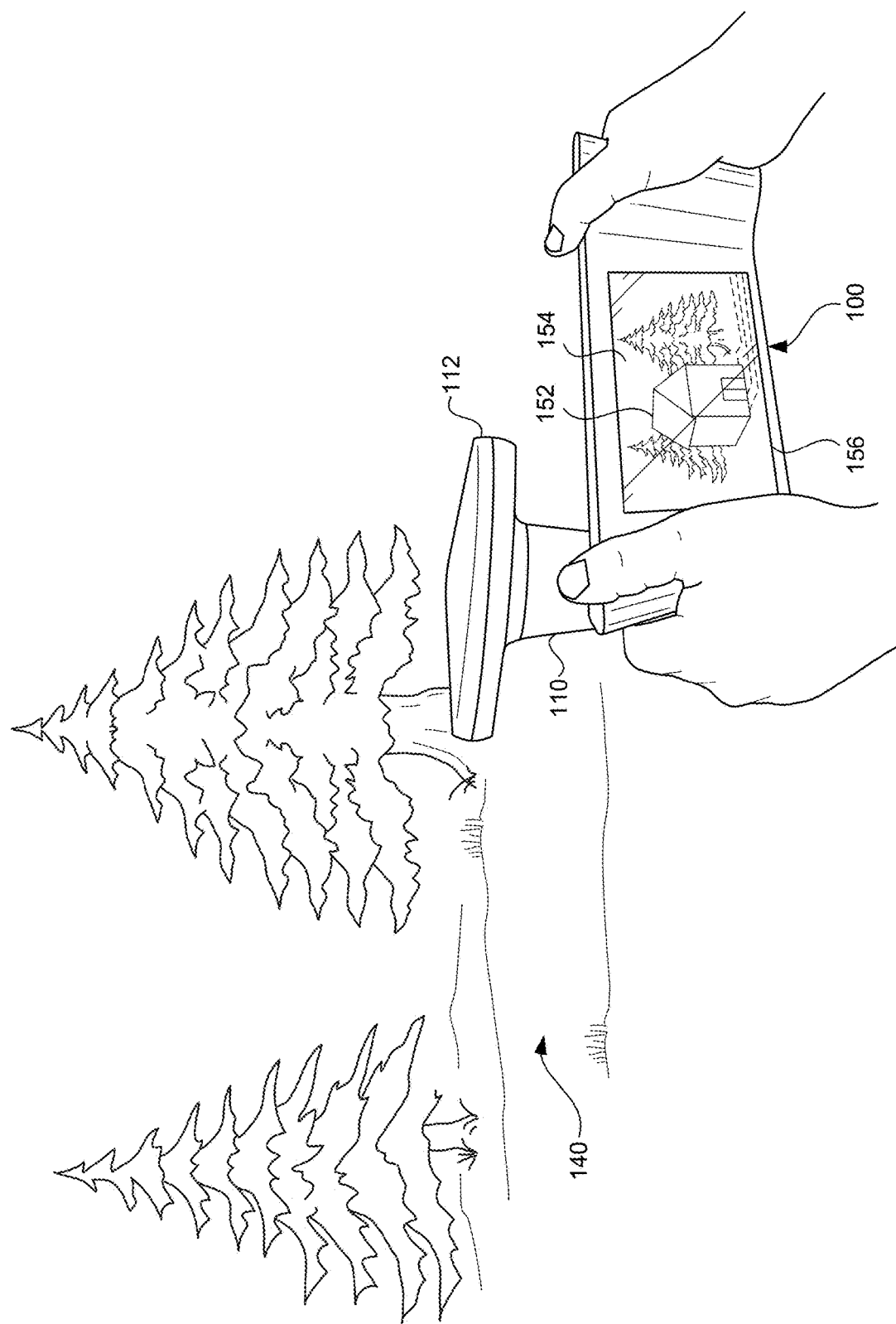
FIG. 1 illustrates a conventional AR device in use within an environment.

FIG. 1 illustrates a conventional AR device 100 in use at a potential construction site 140. The AR device 100 is a handheld device that may be moved around to view different parts of the potential construction site 140. Different parts of an AR model may be viewed in the different parts of the potential construction site 140 depending on where the AR model is anchored on the potential construction site 140.

The AR device 100 in this example includes a display 156 for displaying an AR model 152 that is superimposed onto an image 154. The image 154 is acquired with a camera (not shown). The AR device 100 may be communicatively coupled to or integrated with a GNSS receiver 110. The GNSS receiver 110 includes an antenna 112 and may be configured to provide high-accuracy position data. Where the spatial relationship between the antenna 112 and the camera is known, the position data generated by the GNSS receiver 110 may be used to determine position data for the camera. The position data enables proper placement of the AR model 152 within the image 154. Although FIG. 1 depicts an outdoor setting, use of the AR device 100 in various indoor settings is also possible.

FIGS. 2A-2E are simplified drawings illustrating a method for positioning an AR model of a room relative to an image of the room 254 as displayed on a handheld device 200, according to an embodiment of the present disclosure. The method includes identifying planes in a surrounding environment and identifying corresponding planes in an AR model. The handheld device 200 is an AR device that includes a display 256 for displaying the image of the room 254. The image of the room 254 is a camera image that is obtained using one or more cameras of the handheld device 200. The image of the room 254, or any other image described herein, may include a video image or one or more still images.

In this example, the handheld device 200 is shown without a GNSS receiver or antenna merely for simplicity. Each of the embodiments described herein may be implemented on AR devices with our without GNSS or other positioning capabilities.

Figure 2A:
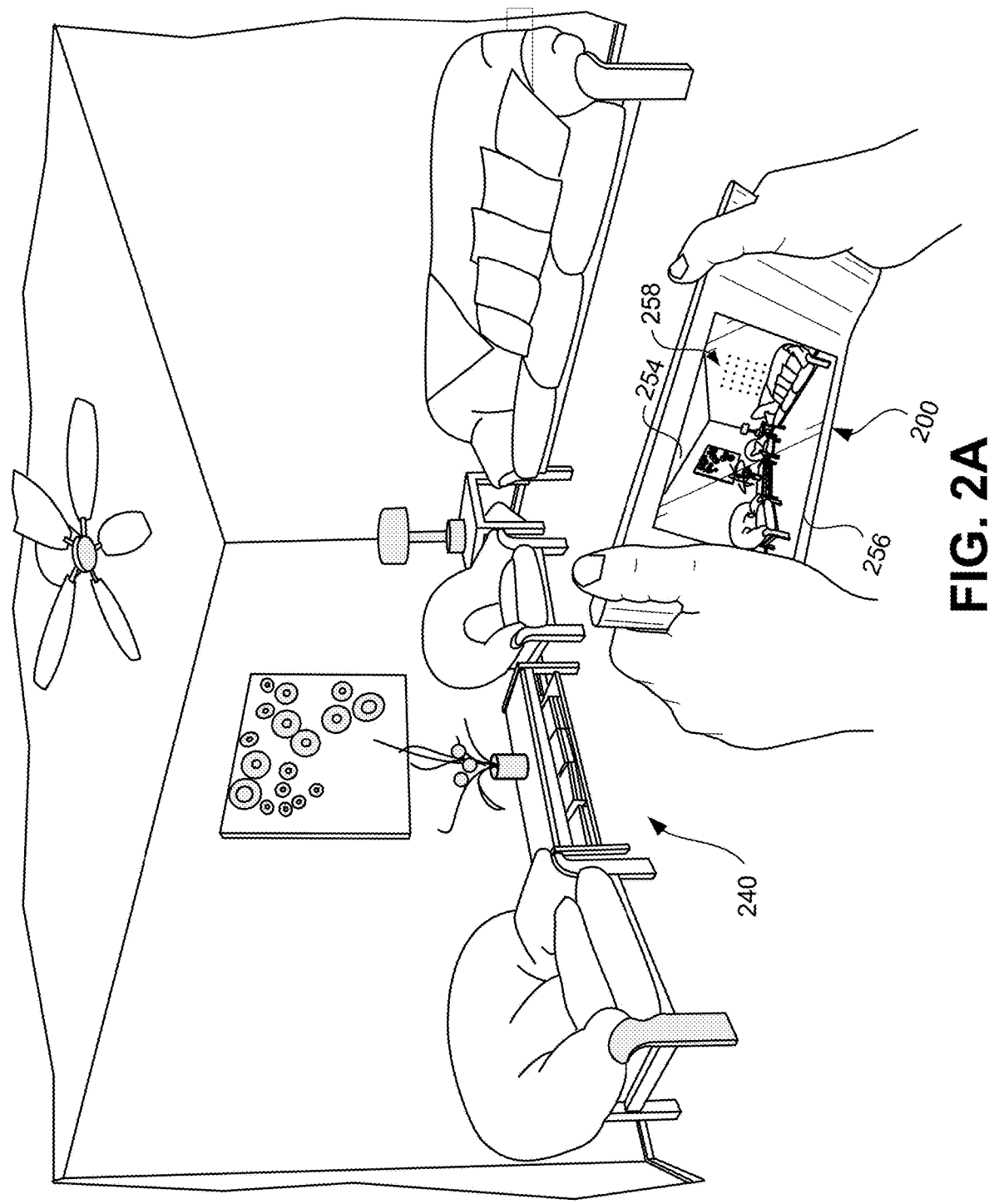

In FIG. 2A, a plane detection function of the handheld device 200 is used to identify a plane in the room. This is illustrated by point cloud 258 shown in the image of the room 254 as displayed on the handheld device 200. The plane detection function may be carried out by known environmental understanding techniques provided with many conventional AR devices. The environmental understanding techniques can detect sizes and locations of flat surfaces. In FIG. 2A, the wall above the couch is identified as a plane.

Figure 2B:
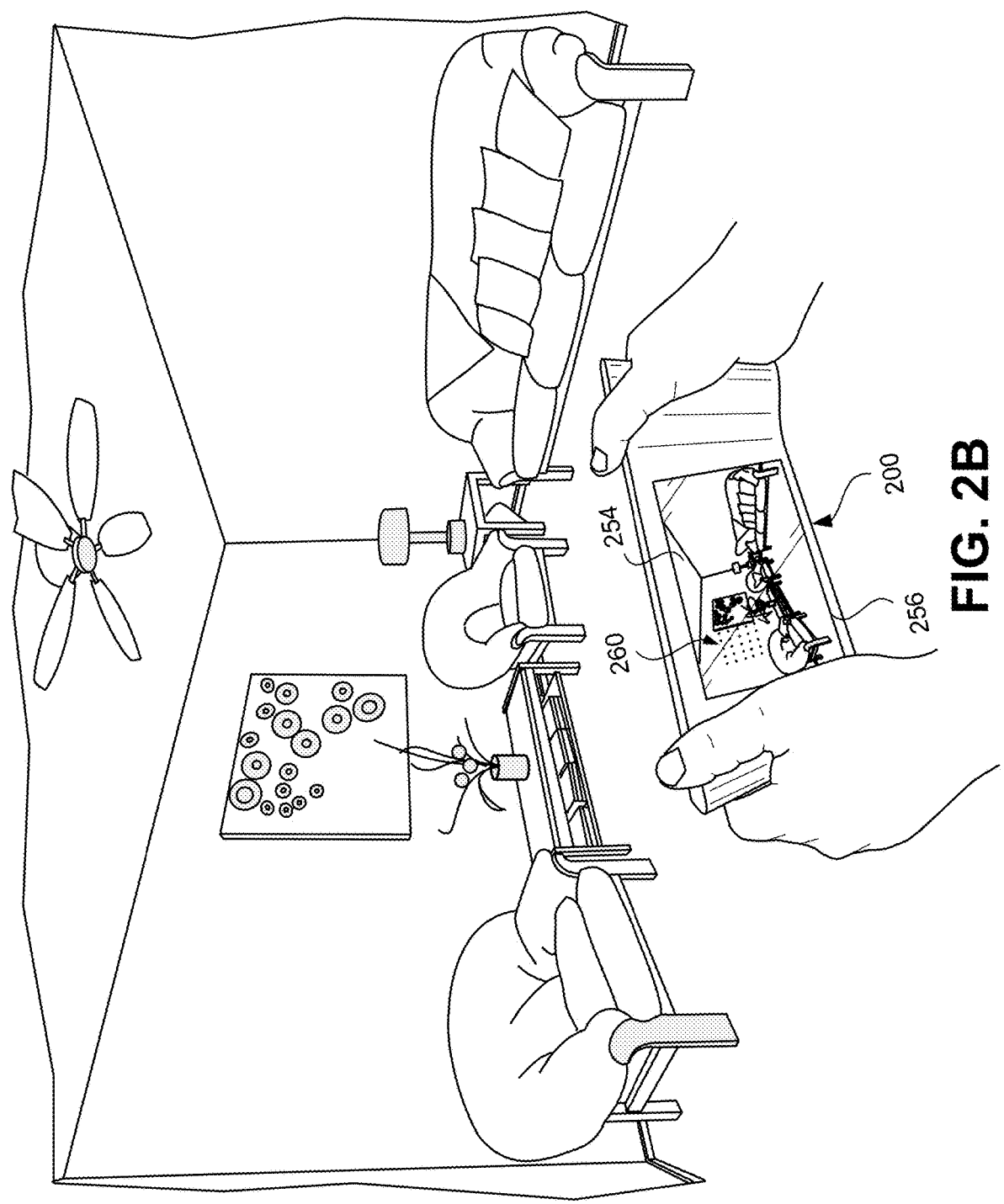
Figure 2C:
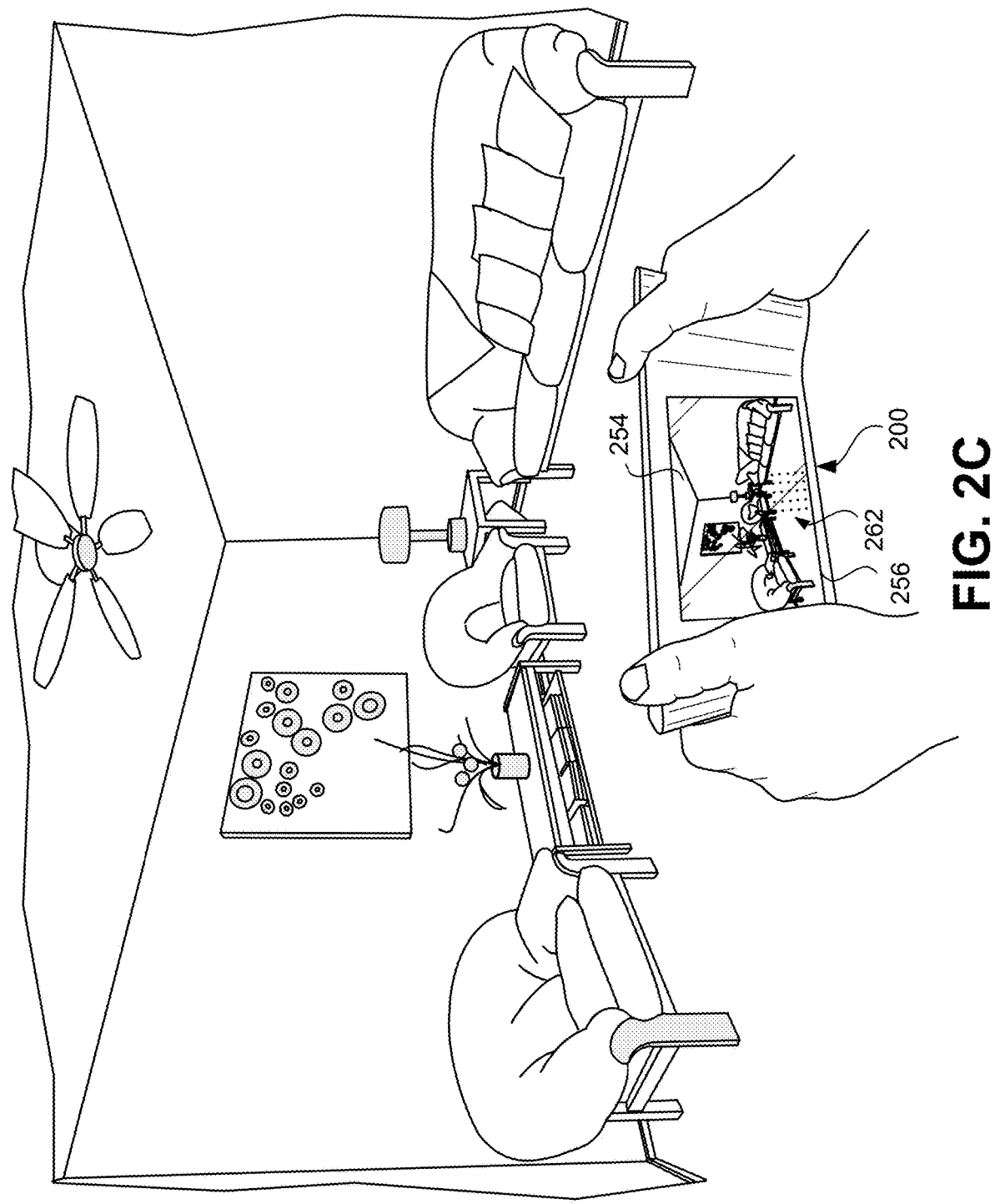

In FIGS. 2B-2C, the plane detection function of the handheld device 200 is used to identify other planes in the room. This is illustrated by point cloud 260 shown in FIG. 2B and point cloud 262 shown in FIG. 2C. In FIG. 2B, the wall above the chairs and flower is identified as a plane, and in FIG. 2C, the floor is identified as another plane.

FIGS. 2A-2C may appear to illustrate that identification of the walls and floor as planes are discrete events. It should be appreciated that the handheld device 200 can be swept across the room one or more times and the plane detection function may operate on each of the planes sequentially or concurrently using obtained image information.

Figure 2D:
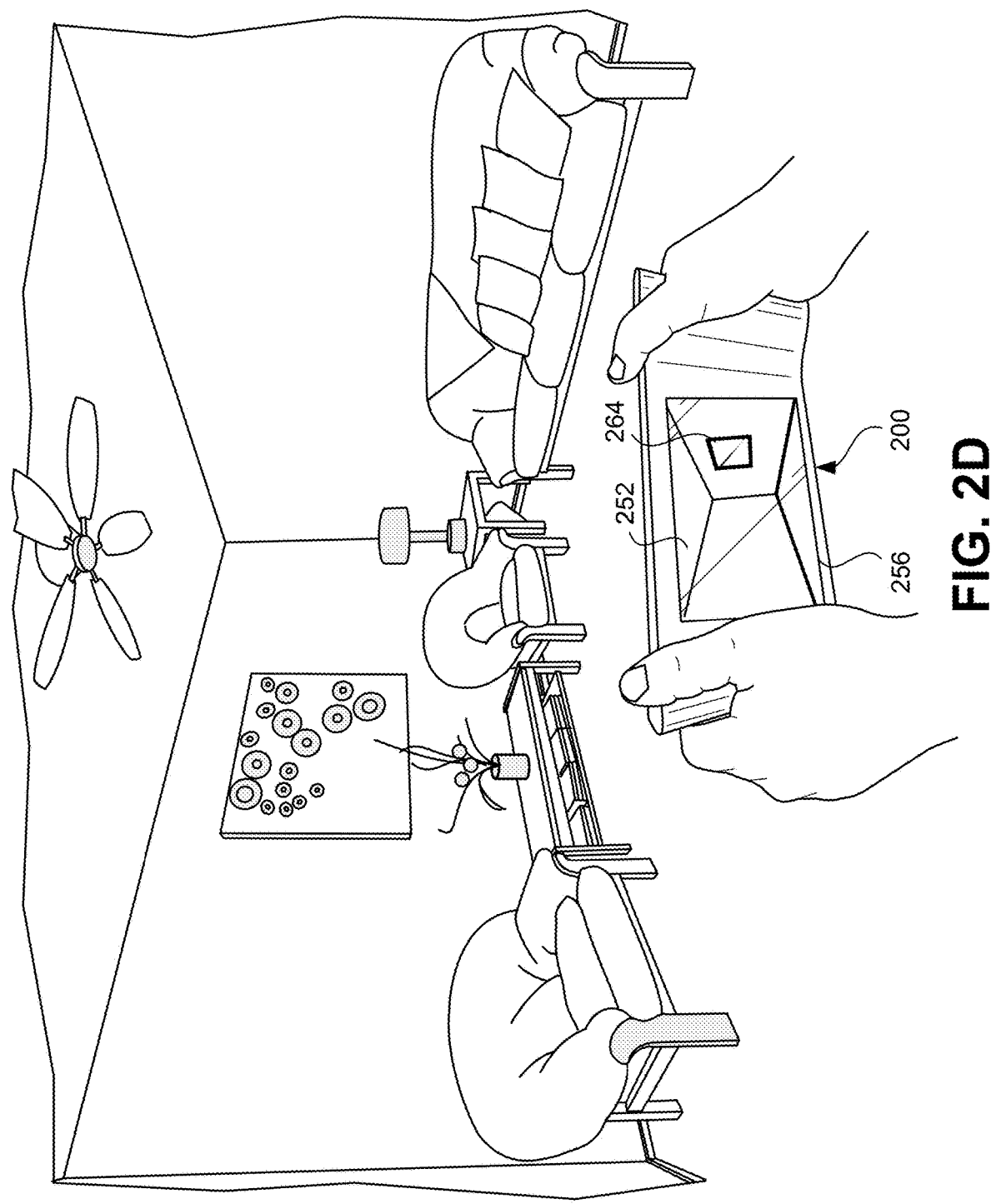

FIG. 2D shows an AR model 252 on the display 256 of the handheld device 200. The AR model 252 in this example includes walls and a floor but does not include the couch, chairs, tables, lamp, flowers, picture, or ceiling fan that exist in the room. The AR model 252 does, however, include a window 264 on the wall behind the couch. The window does not exist physically in the room, but it does exist in the AR model 252.

Using the size and location of the walls and floor identified using the plane detection function of the handheld device 200, a coordinate frame associated with the AR model can be shifted so that walls and the floor of the AR model align with corresponding walls and floor in the image of the room 254.

FIG. 2D is intended to show that the AR model 252 is not aligned with the corresponding objects in the image of the room and instead completely covers the image of the room. If the AR model 252 was aligned with the corresponding objects in the room and in the real world, the couch, chairs, and table would appear to sit on a floor of the AR model 252 and the picture would appear to hang on the wall of the AR model 252. The wall behind the couch would also appear to have the window 264. In FIG. 2D, the AR model 252 is in front of the corresponding objects in the image of the room and completely occludes the objects.

FIG. 2E is intended to show that the walls and floor of the AR model are aligned with the walls and floor in the image of the room. Compared to FIG. 2D, a coordinate frame associated with the AR model has been shifted so that the walls and floor of the AR model are aligned with the corresponding walls and floor in the image of the room. Note that the wall behind the couch has the window 264 from the AR model 252. Additional details on shifting the AR model to align with the corresponding objects in the room and in the real world are included in the following description of the flowchart of FIG. 3.

The embodiment illustrated in FIGS. 2A-2E and other embodiments described below are carried out in a room. The room is used merely as an example, and the methods described herein may be used to align AR models with corresponding objects in most any type of structure that includes vertical and horizontal surfaces. This includes buildings and areas of construction where a structure is being built.

Figure 3:
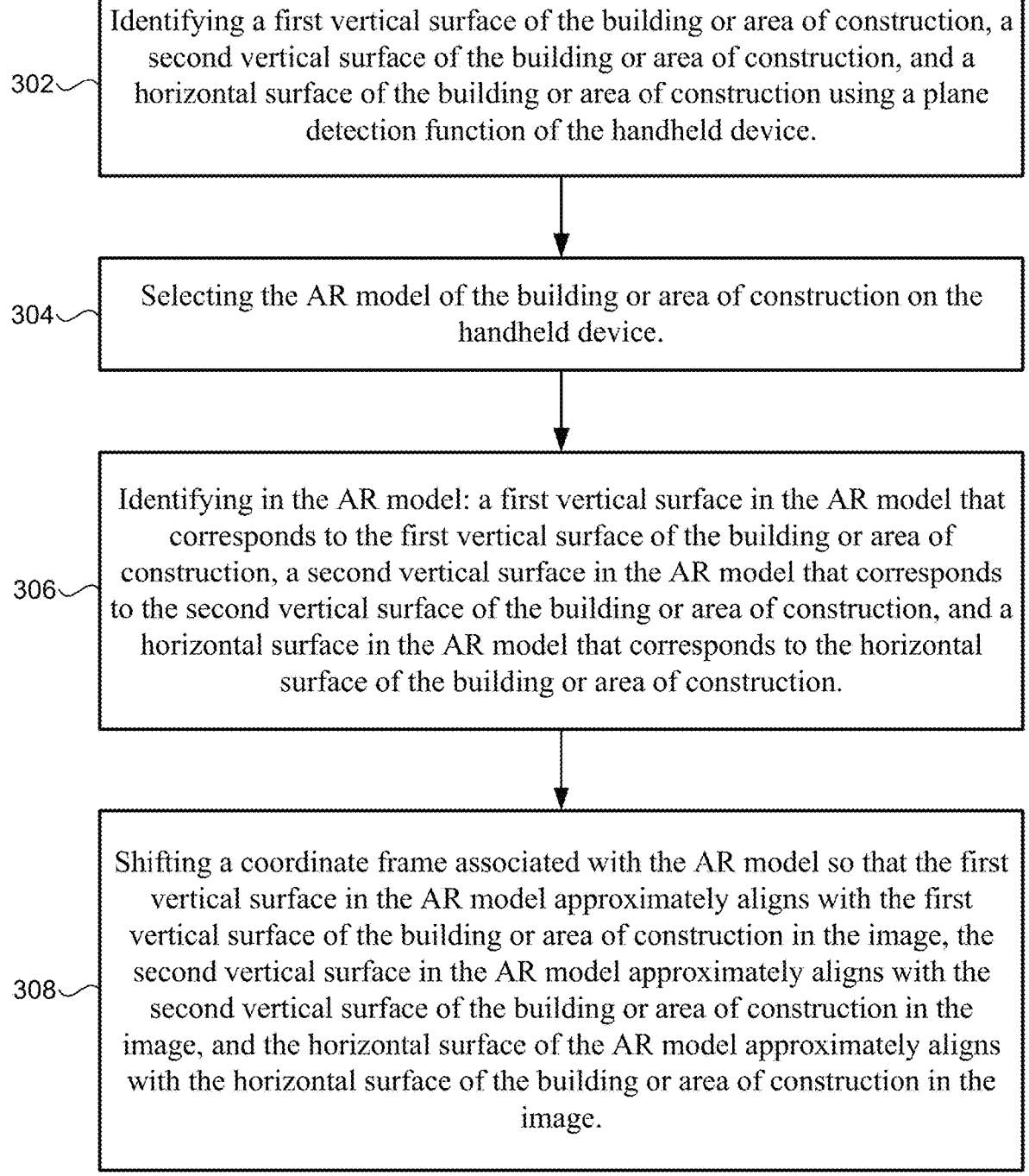
FIG. 3 is a flowchart of a method for positioning an AR model of a building or area of construction relative to an image of the building or area of construction as displayed on a handheld device, according to an embodiment of the present disclosure.

FIG. 3 is a flowchart of a method for positioning an AR model of a building or area of construction relative to an image of the building or area of construction as displayed on a handheld device, according to an embodiment of the present disclosure. This method aligns vertical surfaces of the AR model with vertical surfaces of the building or area of construction in the image and aligns a horizontal surface of the AR model with a horizontal surface of the building or area of construction in the image. This method allows an AR model to be accurately placed within an image of the real world or a real time video feed of the real world. This can allow a user, for example, to view an AR model of a completed building while the building is under construction. The user can view features of the building that exist in the AR model but do not yet exist in the actual building, and the features can be accurately aligned and accurately positioned within the existing structure.

The method includes identifying a first vertical surface of the building or area of construction, a second vertical surface of the building or area of construction, and a horizontal surface of the building or area of construction using a plane detection function of the handheld device (302). The vertical and horizontal surfaces may be identified by moving the handheld device so that a camera of the handheld device obtains image information from each of the surfaces allowing the handheld device to identify a size and location of the surfaces using known environmental understanding techniques.

The AR model of the building or area of construction is selected on the handheld device (304). As used herein, an AR model may be a three-dimensional (3D) model of the building or area of construction, or features associated with the building or area of construction. As an example, the AR model may be a 3D model of a building that is currently under construction. The 3D model may include planned features of the building that do not exist because they have not yet been built. The AR model may be selected by a user, for example, by selecting a file associated with the AR model or selecting the particular model in an AR application running on the handheld device.

The method also includes identifying in the AR model: a first vertical surface in the AR model that corresponds to the first vertical surface of the building or area of construction, a second vertical surface in the AR model that corresponds to the second vertical surface of the building or area of construction, and a horizontal surface in the AR model that corresponds to the horizontal surface of the building or area of construction (306). The first and second vertical surfaces and the horizontal surface may be selected by a user. This step associates the surfaces of the building or area of construction identified in step (302) with corresponding surfaces in the AR model. As an example, if the building or area of construction includes a hotel or another large building, a user may identify surfaces in the AR model that correspond to surfaces being displayed on the handheld device. For example, the user may be in a particular room on a first floor of a building, and the user may identify the same room in the AR device and more particularly the same walls and floor that are being displayed on the handheld device.

A coordinate frame associated with the AR model is shifted so that the first vertical surface in the AR model accurately aligns with the first vertical surface of the building or area of construction in the image, the second vertical surface in the AR model accurately aligns with the second vertical surface of the building or area of construction in the image, and the horizontal surface of the AR model accurately aligns with the horizontal surface of the building or area of construction in the image (308). The size and location of the surfaces identified in step (302) are used to align the walls and floor of the AR model with the surfaces in the image. As used herein, the surfaces in the AR model will be accurately aligned when they are within a few millimeters of the corresponding surfaces in the image.

FIGS. 4A-4D are simplified drawings illustrating a method for positioning an AR model of a room relative to an image of the room 454 as displayed on a handheld device 400, according to another embodiment of the present disclosure. The method includes performing distance measurements from the handheld device to points on surfaces in the room and identifying corresponding surfaces in the AR model. The handheld device 400 is an AR device that includes a display 456 for displaying the image of the room 454. The image of the room 454 is an image that is obtained using one or more cameras of the handheld device 400. Although not explicitly shown in this example, the handheld device 400 includes a distance measurement unit configured to obtain distance information and tilt sensors configured to obtain tilt information. The distance measurement unit has a known spatial relationship with one or more cameras of the handheld device 400.

Figure 4A:
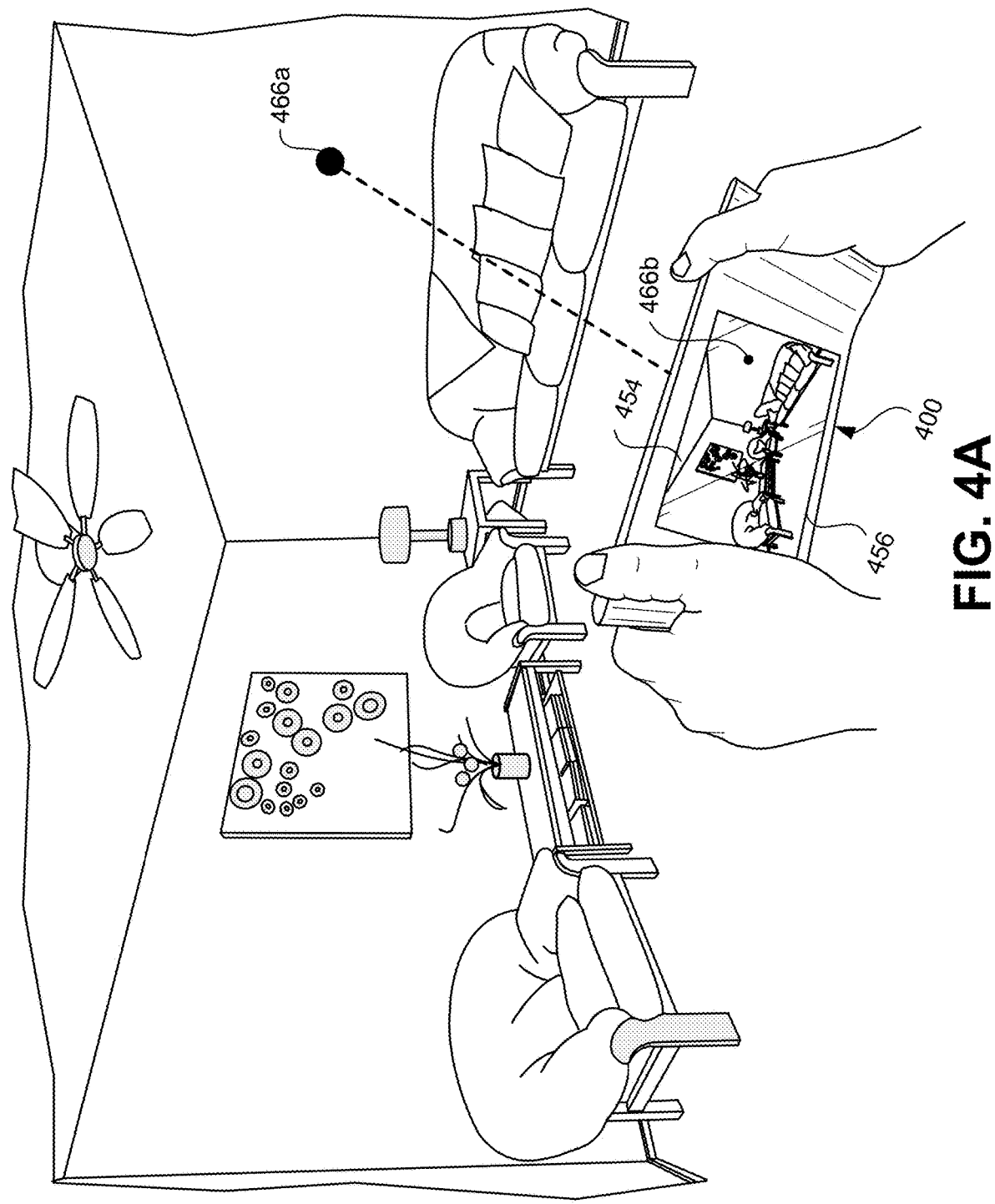
FIGS. 4A-4D are simplified drawings illustrating a method for positioning an AR model of a room relative to an image of the room as displayed on a handheld device, according to another embodiment of the present disclosure.

In FIG. 4A, the distance measurement unit (not shown) is used to measure a distance from the handheld device 400 to a point 466a on a wall behind the couch. This is illustrated by the dashed line extending from the handheld device 400 to the point 466a. The point 466a is shown in the image of the room 454 as point 466b.

Figure 4B:
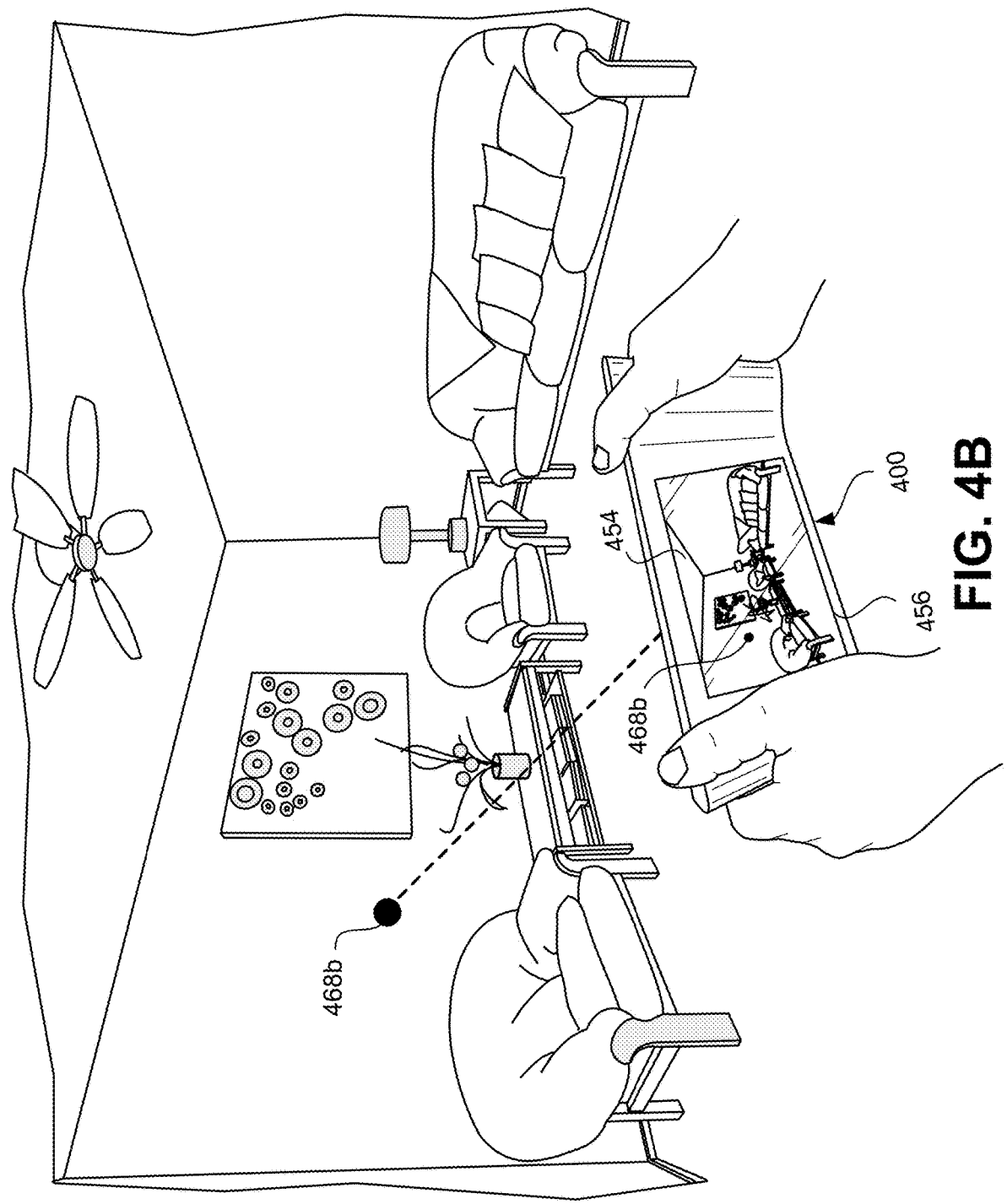

In FIG. 4B, the distance measurement unit is used to measure a distance from the handheld device 400 to a point 468a on a wall next to the picture. This is illustrated by the dashed line extending from the handheld device 400 to the point 468a. The point 468a is shown in the image of the room 454 as point 468b.

Figure 4C:
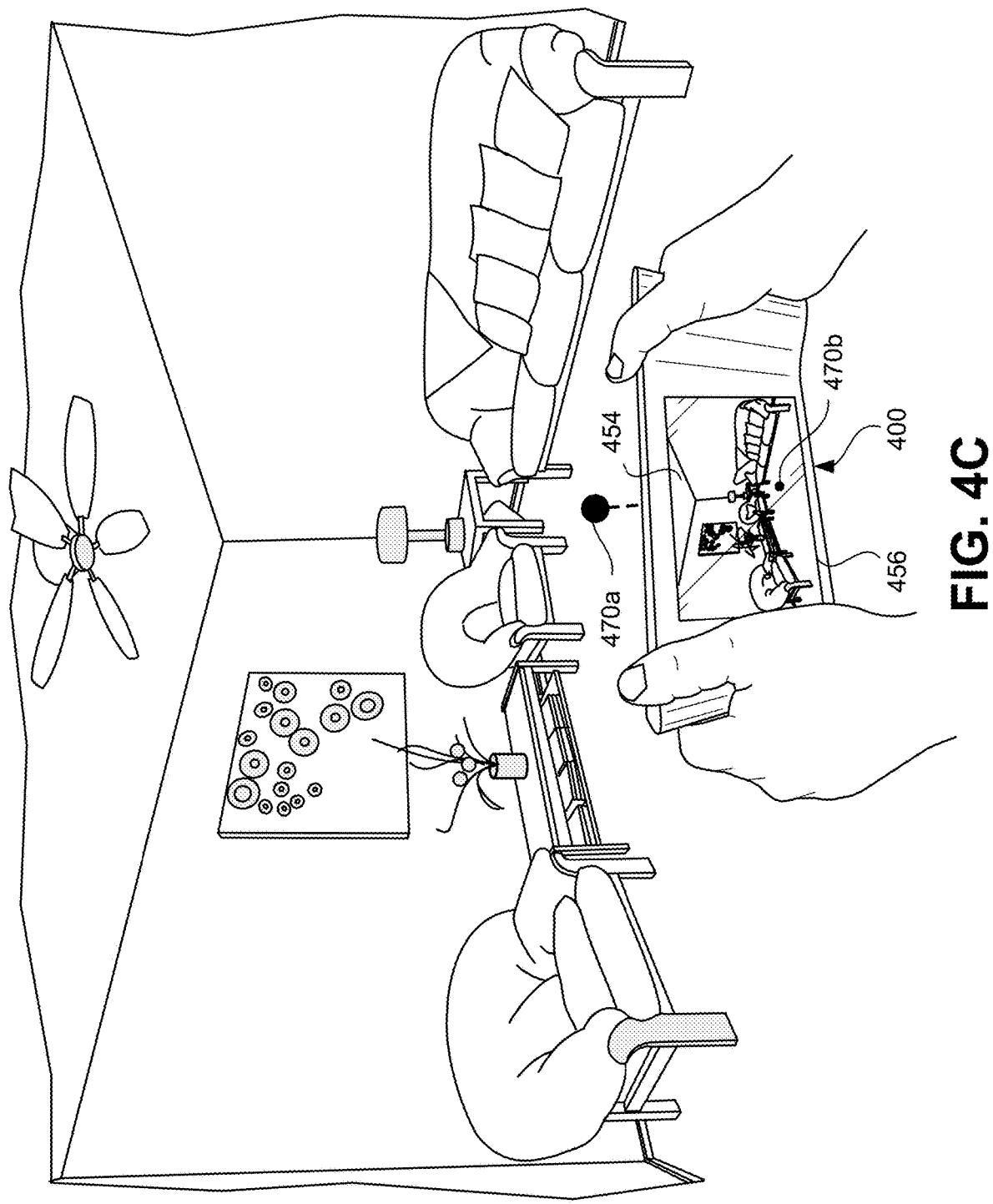

In FIG. 4C, the distance measurement unit is used to measure a distance from the handheld device 400 to a point 470a on the floor. This is illustrated by the dashed line extending from the handheld device 400 to the point 470a. The point 470a is shown in the image of the room 454 as point 470b.

Additional distances may be measured from the handheld device 400 to points on the walls or floor. Using these additional distances, horizontal distances between the handheld device 400 and the points 466a and 468a, and a vertical distance between the handheld device 400 and the point 470a on the floor, a coordinate frame associated with the AR model can be shifted so that the walls and floor of the AR model align with corresponding walls and floor in the image of the room 454 and in the real world. The horizontal and vertical distances may be determined using the measured distances and a tilt of the handheld device 400 at the time of the measurement.

Alternatively, a plane detection function of the handheld device 400 may be used to detect one or more surfaces in the real world, and the horizontal distances between the handheld device 400 and the points 466a and 468a and/or the vertical distance between the handheld device 400 and the point 470a on the floor may be used to improve accuracy of a location of the one or more surfaces. The location of the one or more surfaces may be used to shift the coordinate frame associated with the AR model so the walls and floor of the AR model align with corresponding walls and floor in the image of the room 454 and in the real world. Depending on the surfaces detected, the horizontal distances between the handheld device 400 and the points 466a and 468a and/or the vertical distance between the handheld device 400 and the point 470a on the floor may also be used to shift the coordinate frame associated with the AR model.

There are certain features of the room that can be used to align the walls and floor of the AR model with the corresponding walls and floor in the image of the room 454. For example, it can be assumed that the walls are vertical (aligned with a gravity vector), that the floor is horizontal (perpendicular to the gravity vector), and/or that the walls of the room intersect at a right angle.

Figure 4D:
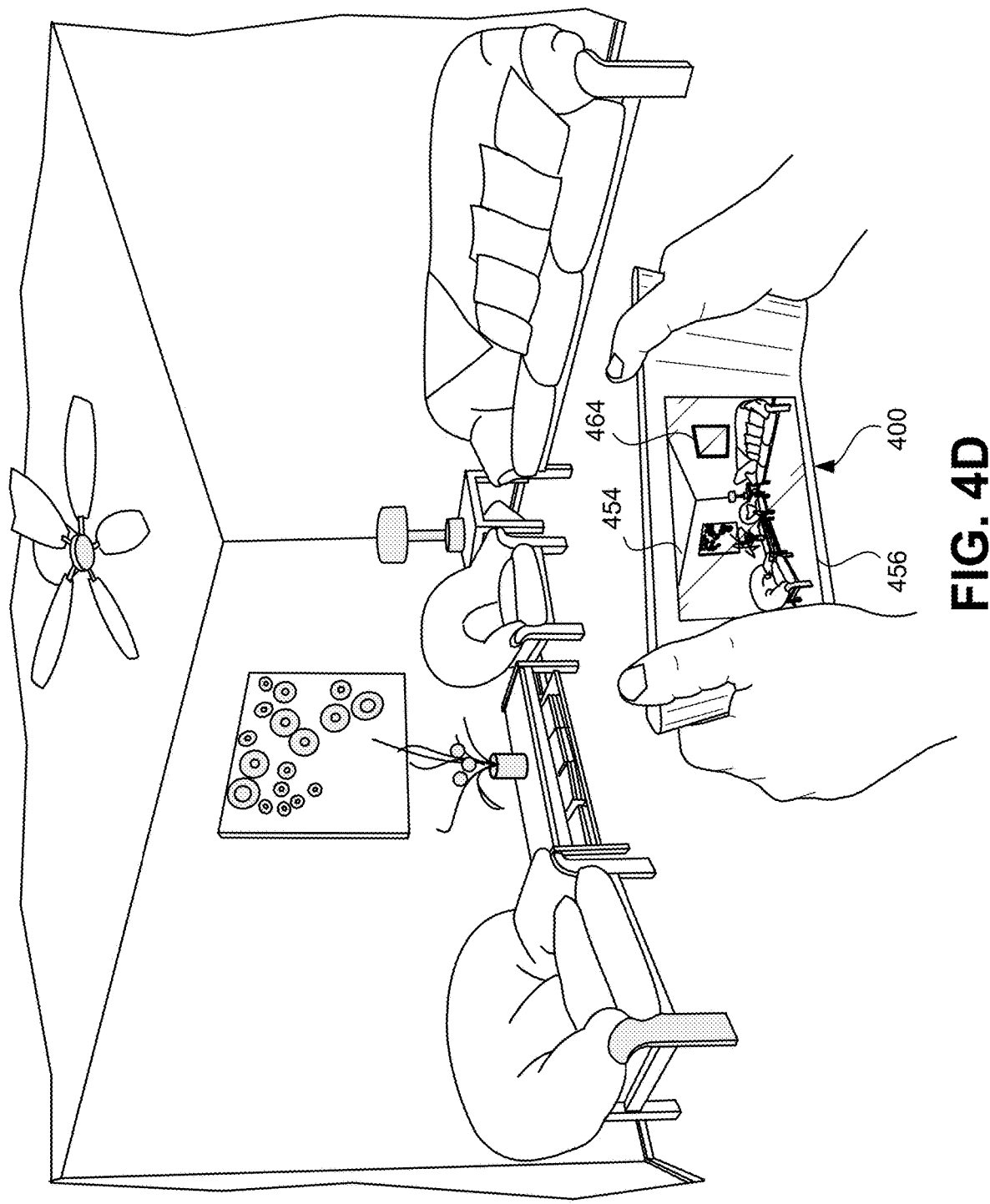

FIG. 4D is intended to show that the walls and floor of the AR model are aligned with the walls and floor in the image of the room (assuming the AR model in this example is similar to that shown in FIG. 2D and includes walls, a window, and a floor, but does not include the couch, chairs, tables, lamp, flowers, picture, or ceiling fan that exist in the room). Compared to FIG. 4C, a coordinate frame associated with the AR model has been shifted so that the walls and floor of the AR model are aligned with the corresponding walls and floor in the image of the room. Note that the wall behind the couch has the window 464 from the AR model. Additional details on shifting the AR model to align with the corresponding objects in the room and in the real world are included in the following description of the flowchart of FIG. 5.

Figure 5:
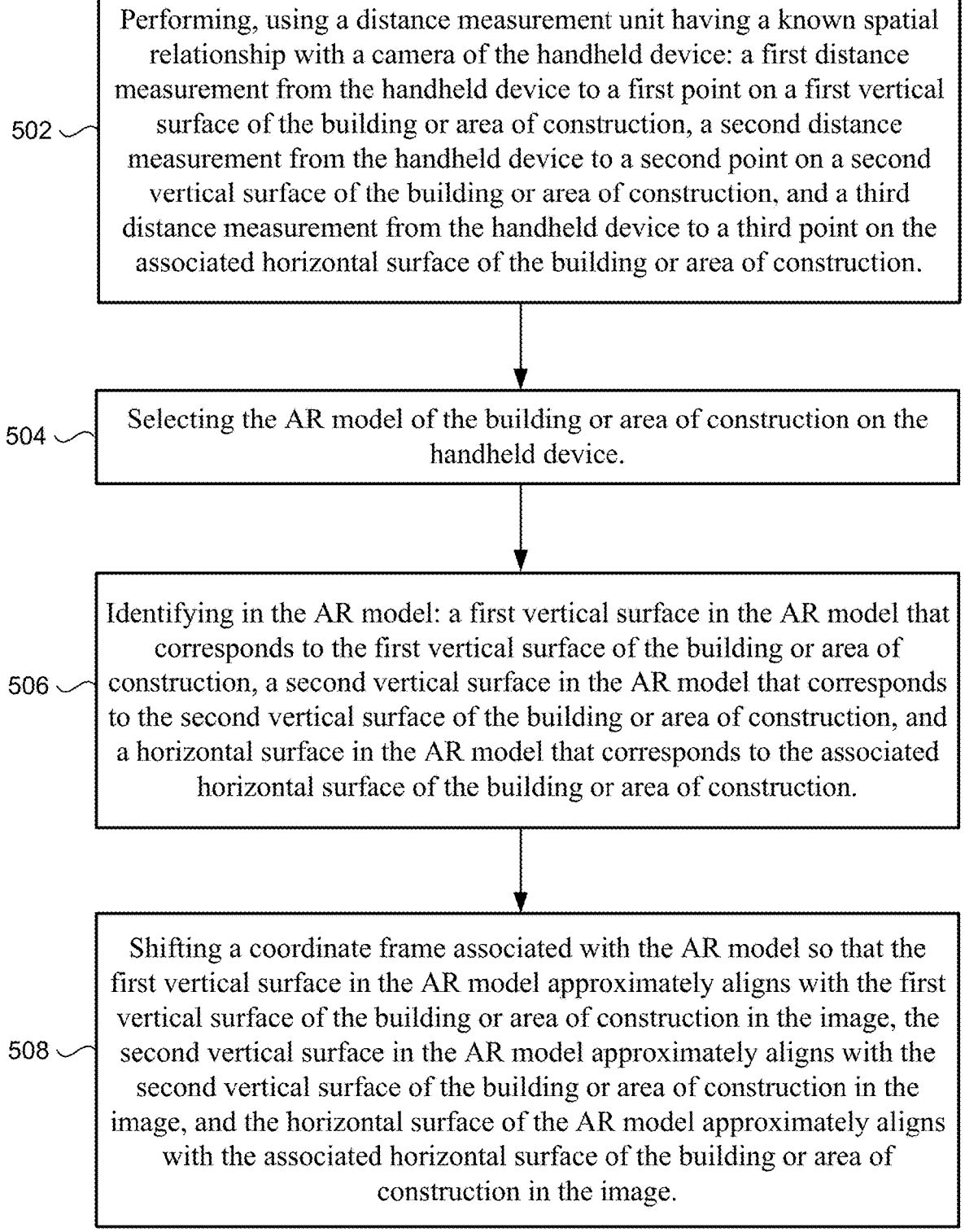
FIG. 5 is a flowchart of a method for positioning an AR model of a building or area of construction relative to an image of the building or area of construction as displayed on a handheld device, according to another embodiment of the present disclosure.

FIG. 5 is a flowchart of a method for positioning an AR model of a building or area of construction relative to an image of the building or area of construction as displayed on a handheld device, according to another embodiment of the present disclosure. This method aligns vertical surfaces of the AR model with vertical surfaces of the building or area of construction in the image and aligns a horizontal surface of the AR model with a horizontal surface of the building or area of construction in the image.

The method includes performing, using a distance measurement unit having a known spatial relationship with a camera of the handheld device: a first distance measurement from the handheld device to a first point on a first vertical surface of the building or area of construction, a second distance measurement from the handheld device to a second point on a second vertical surface of the building or area of construction, and a third distance measurement from the handheld device to a third point on the horizontal surface of the building or area of construction (502).

The AR model of the building or area of construction is selected on the handheld device (504). The AR model may be selected by a user, for example, by selecting a file associated with the AR model or selecting the particular model in an AR application running on the handheld device.

The method includes identifying in the AR model: a first vertical surface in the AR model that corresponds to the first vertical surface of the building or area of construction, a second vertical surface in the AR model that corresponds to the second vertical surface of the building or area of construction, and a horizontal surface in the AR model that corresponds to the associated horizontal surface of the building or area of construction (506).

The method also includes shifting a coordinate frame associated with the AR model so that the first vertical surface in the AR model accurately aligns with the first vertical surface of the building or area of construction in the image, the second vertical surface in the AR model accurately aligns with the second vertical surface of the building or area of construction in the image, and the horizontal surface of the AR model accurately aligns with the associated horizontal surface of the building or area of construction in the image (508). The first and second vertical surfaces of the building may extend parallel to a gravity vector and may intersect at right angles. The horizontal surface of the building may be the floor and may extend perpendicular to the gravity vector. As used herein, the surfaces in the AR model will be accurately aligned when they are within a few millimeters of the corresponding surfaces in the image.

Some embodiments include:
  Determining a first horizontal distance between the handheld device and the first point using the first distance and a first position and orientation of the handheld device. The first position and orientation are the position and orientation of the handheld device while performing the first measurement.
  Determining a second horizontal distance between the handheld device and the second point using the second distance and a second position and orientation of the handheld device. The second position and orientation are the position and orientation of the handheld device while performing the second measurement.
  Determining third vertical distance between the handheld device and the third point using the third distance and a third position and orientation of the handheld device. The third position and orientation are the position and orientation of the handheld device while performing the third measurement.

The coordinate frame associated with the AR model may be shifted using the first horizontal distance, the second horizontal distance, and the third vertical distance.

FIGS. 6A-6G are simplified drawings illustrating a method for positioning an AR model of a room relative to an image of the room 654 as displayed on a handheld device 600, according to yet another embodiment of the present disclosure. The method includes positioning the AR model inside the room and then performing distance measurements from the handheld device 600 to points on surfaces of the room. The handheld device 600 is an AR device that includes a display 656 for displaying the image of the room 654. The image of the room 654 is a camera image that is obtained using one or more cameras of the handheld device 600. Although not explicitly shown in this example, the handheld device 600 includes a distance measurement unit configured to obtain distance information. The distance measurement unit has a known spatial relationship with one or more cameras of the handheld device 600.

Figure 6A:
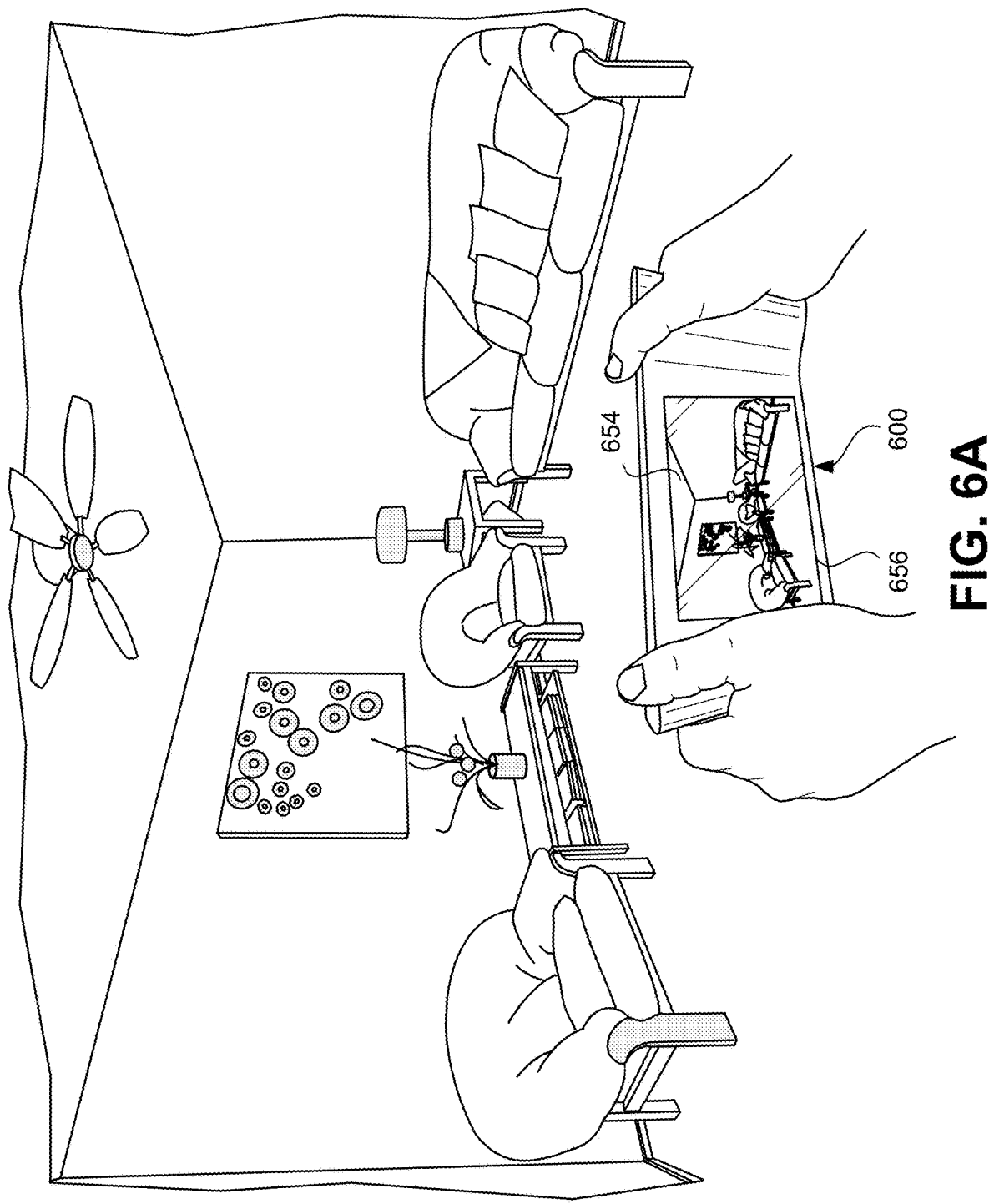
Figure 6B:
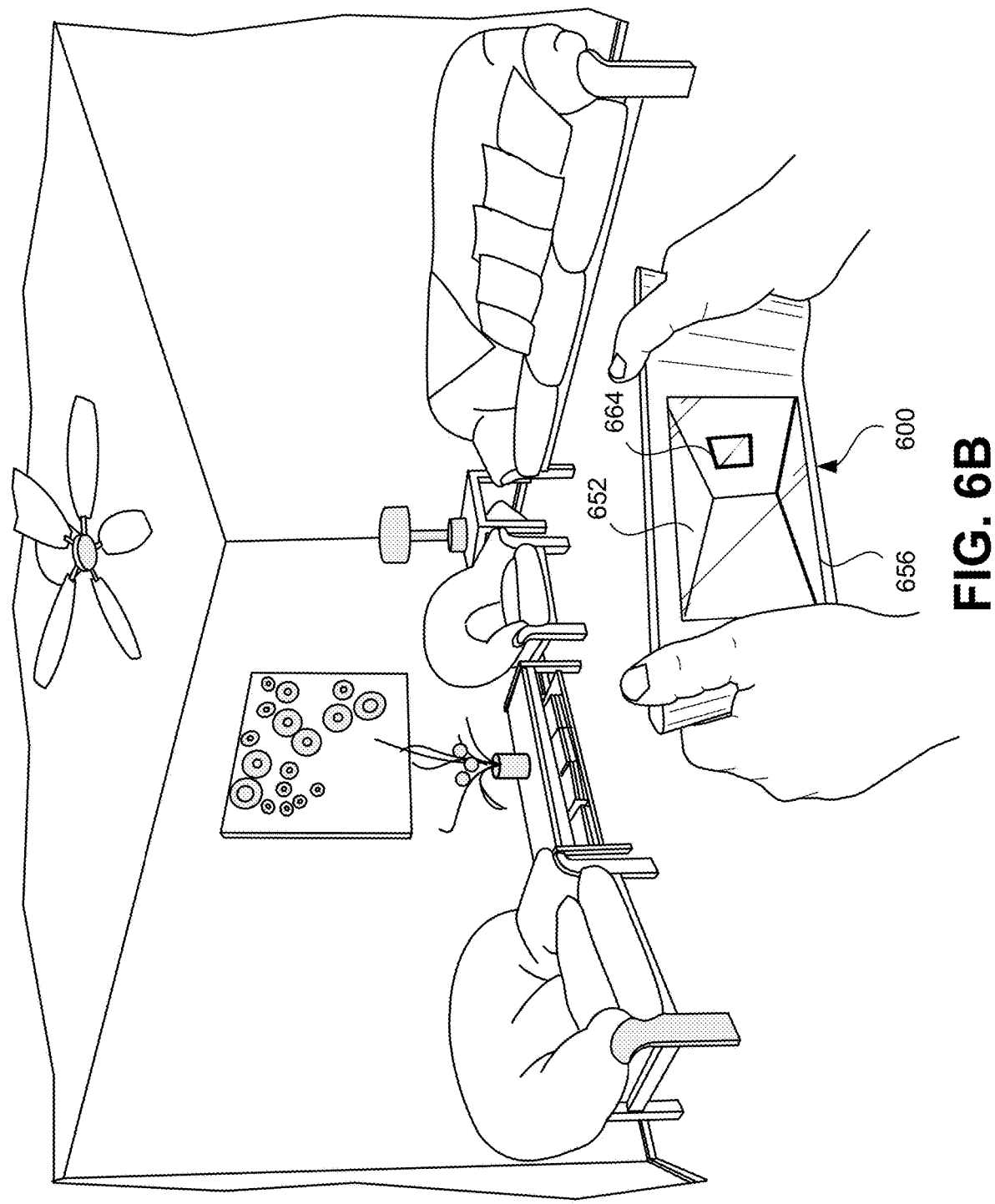

FIG. 6A shows the image of the room on the handheld device 600, and FIG. 6B shows the AR model 652 positioned inside the room as displayed on the handheld device 600. The AR model includes a window 664. The AR model 652 is positioned inside the room by moving the AR model of the room relative to the image of the room 654 so that vertical surfaces of the AR model 652 are located between a position of the handheld device 600 and the vertical surfaces of the room in the image, and the horizontal surface of the AR model is located between the position of the handheld device and an associated horizontal surface of the room in the image. When the AR model 652 is positioned inside the room displayed on the handheld device 600, the AR model 652 will occlude the image of the room 654. When the AR model 652 is positioned outside the room displayed on the handheld device 600, the walls and/or floor in the image of the room will occlude the corresponding walls and/or floor of the AR model 652.

Figure 6C:
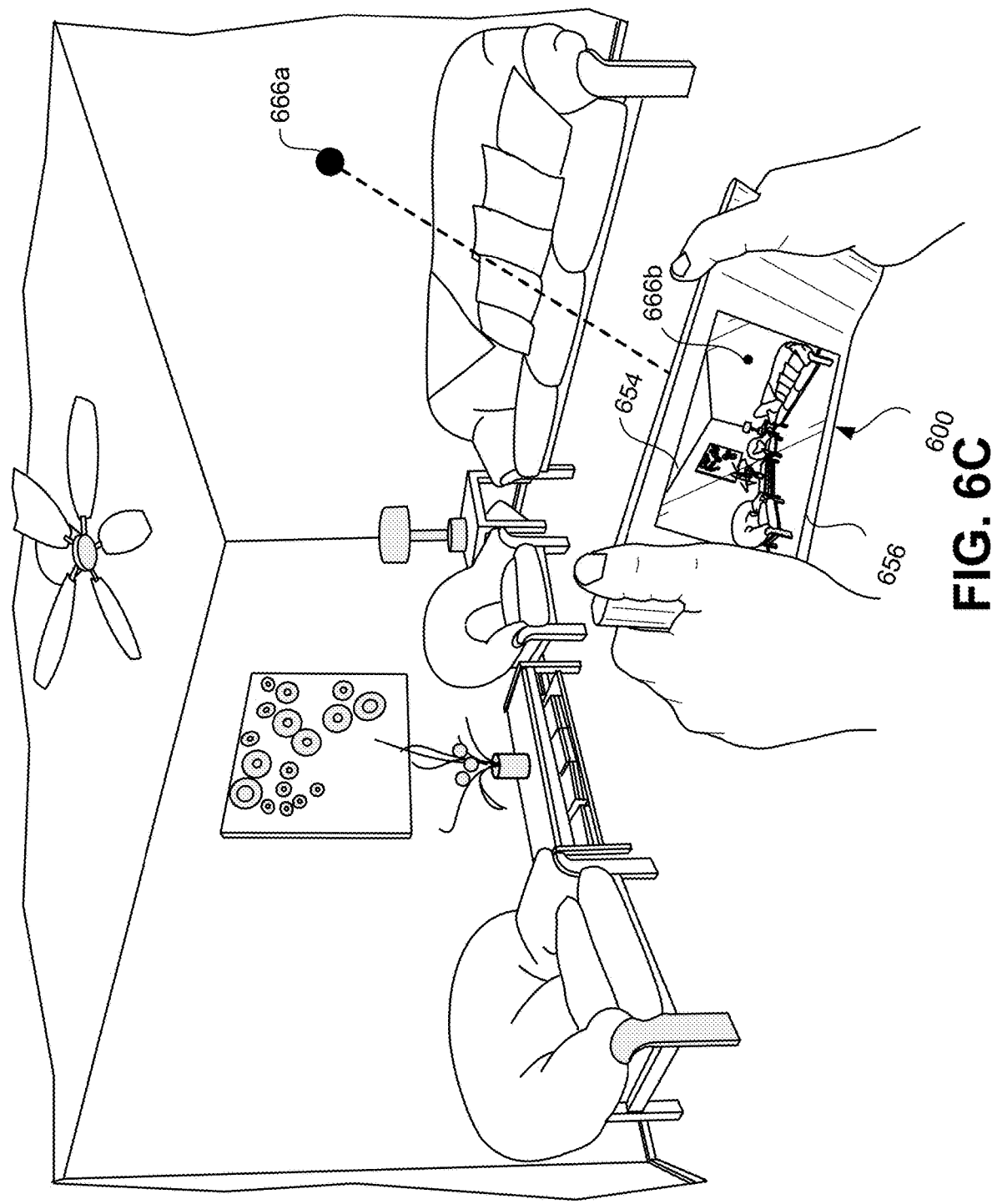

In FIG. 6C, a distance is measured from the handheld device 600 to a point 666a on a wall behind the couch. This is illustrated by the dashed line extending from the handheld device 600 to the point 666a. The point 666a is shown in the image of the room 654 as point 666b.

In FIG. 6D, a distance is measured from the handheld device 600 to a point 667a on the wall behind the couch. This is illustrated by the dashed line extending from the handheld device 600 to the point 667a. The point 667a is shown in the image of the room 654 as point 667b.

Figure 6E:
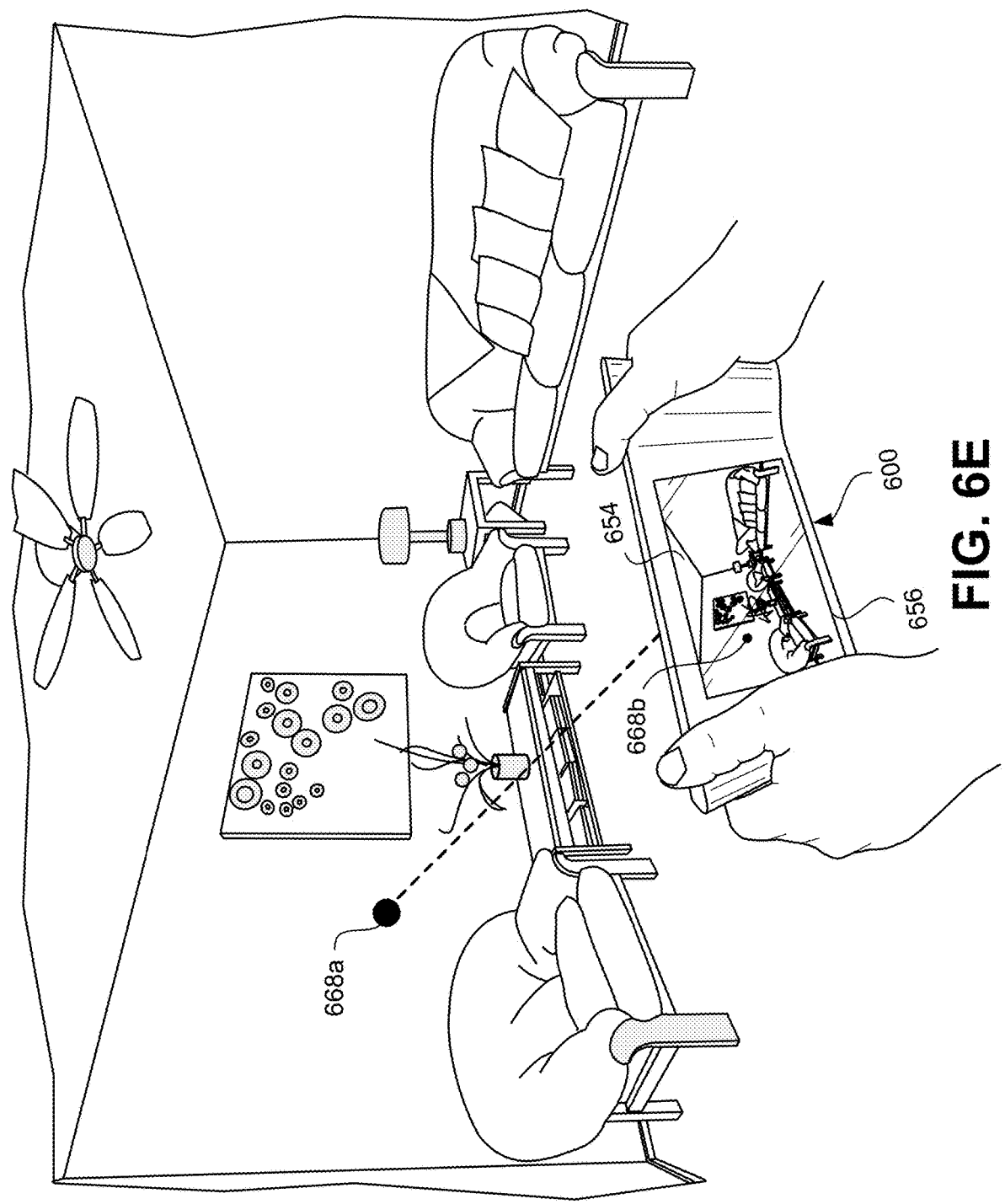

In FIG. 6E, a distance is measured from the handheld device 600 to a point 668a on a wall next to the picture. This is illustrated by the dashed line extending from the handheld device 600 to the point 668a. The point 668a is shown in the image of the room 654 as point 668b.

Figure 6F:
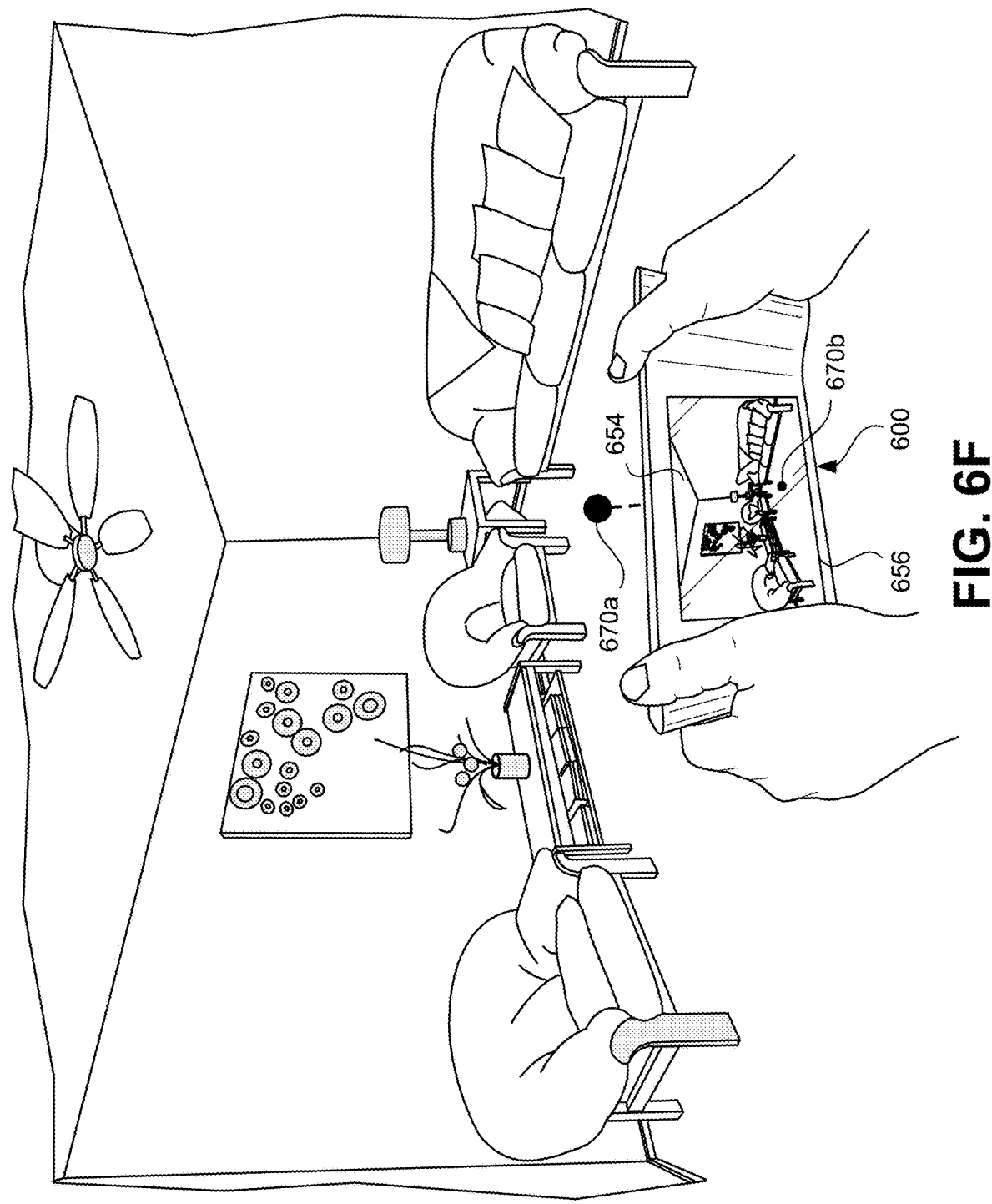

In FIG. 6F, a distance is measured from the handheld device 600 to a point 670a on the floor. This is illustrated by the dashed line extending from the handheld device 600 to the point 670a. The point 670a is shown in the image of the room 654 as point 670b.

In a coordinate frame associated with the room, coordinates of the points 666a, 667a, 668a, 670a are determined, and in a coordinate frame associated with the AR model 652, coordinates of points where a measurement beam intersects the AR model while performing the distance measurements to the points 666a, 667a, 668a, 670a are determined. The beam does not physically intersect the AR model because the AR model does not exist physically in the room, but the beam does extend from the handheld device 600 to the points 666a, 667a, 668a, 670a, and since the AR model is positioned inside the room, the beam will pass through a point of the AR model in the image depending on where the AR model is positioned.

Using the coordinates in the coordinate frame associated with the room, and the coordinates in the coordinate frame associated with the AR model, the coordinate frame associated with the AR model is shifted so that the walls and floor of the AR model are aligned with the corresponding walls and floor in the image of the room 654. FIG. 6G is intended to show that the walls and floor of the AR model 652 are aligned with the walls and floor in the image of the room 654. Note that the wall behind the couch has the window 464 from the AR model 652.

In a manner similar to that illustrated with regard to FIGS. 6A-6G, the AR model 652 may be positioned outside the room or partially inside and partially outside the room. For example, in FIG. 6B the AR model 652 is positioned inside the room, and thus the AR model 652 is displayed on the handheld device 600. In other embodiments, the AR model 652 may be positioned outside the room or partially inside and partially outside the room. When the AR model 652 is positioned outside the room displayed on the handheld device 600, the walls and/or floor in the image of the room may occlude the corresponding walls and/or floor of the AR model 652. When the AR model 652 is positioned partially inside and partially outside the room displayed on the handheld device 600, the AR model will occlude a portion of the image of the room, and the image of the room will occlude a portion of the AR model 652.

When the AR model 652 is positioned outside the room or partially inside and partially outside the room, the steps of measuring distances to points 666a, 667a, 668a, 670a illustrated in FIGS. 6C-6F are performed as described previously. In a coordinate frame associated with the room, coordinates of the points 666a, 667a, 668a, 670a are determined, and in a coordinate frame associated with the AR model 652, coordinates of points where a measurement beam intersects the AR model while performing the distance measurements to the points 666a, 667a, 668a, 670a are determined. The beam does not physically intersect the AR model because the AR model does not exist physically in the room, but the beam does extend from the handheld device 600 through the points 666a, 667a, 668a, 670a, and the beam will pass through a point of the AR model depending on where the AR model is positioned.

The points 666a, 667a, 668a, 670a should be selected so that the measurement beams passing through points 666a, 667a also pass through the corresponding wall of the AR model (the wall behind the couch in the room), the point 668a also passes through the corresponding wall of the AR model (the wall with the picture in the room), and the point 670a passes through the floor of the AR model.

Using the coordinates in the coordinate frame associated with the room, and the coordinates in the coordinate frame associated with the AR model, the coordinate frame associated with the AR model is shifted so that the walls and floor of the AR model are aligned with the corresponding walls and floor in the image of the room 654. Once again, FIG. 6G is intended to show that the walls and floor of the AR model 652 are aligned with the walls and floor in the image of the room 654. Note that the wall behind the couch has the window 464 from the AR model 652. Additional details on shifting the AR model to align with the corresponding surfaces in the room and in the real world are included in the following description of the flowchart of FIG. 7.

Figure 7A:
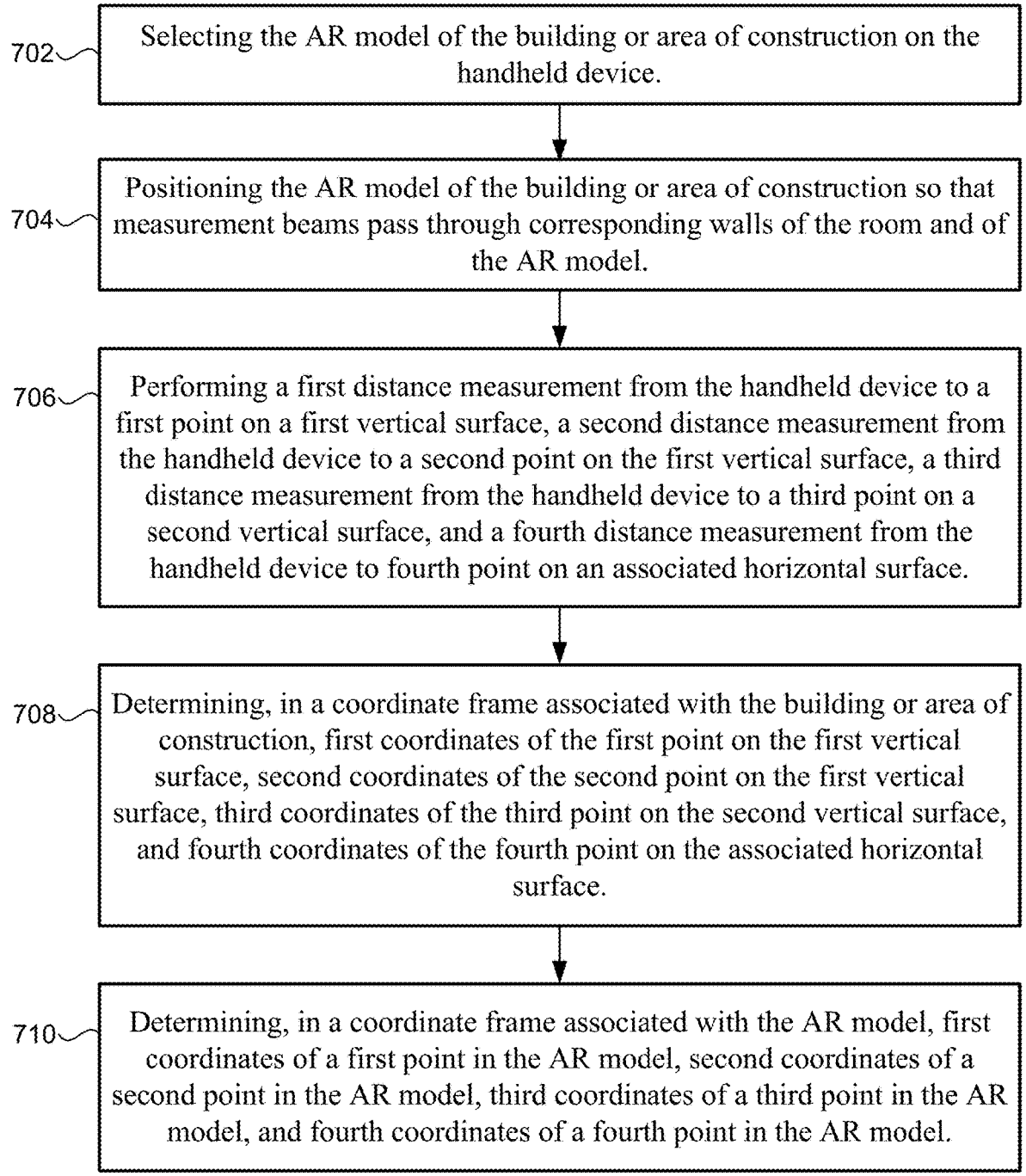
FIG. 7A-7B are a flowchart of a method for positioning an AR model of a building or area of construction relative to an image of the building or area of construction as displayed on a handheld device, according to yet another embodiment of the present disclosure.
Figure 7B:
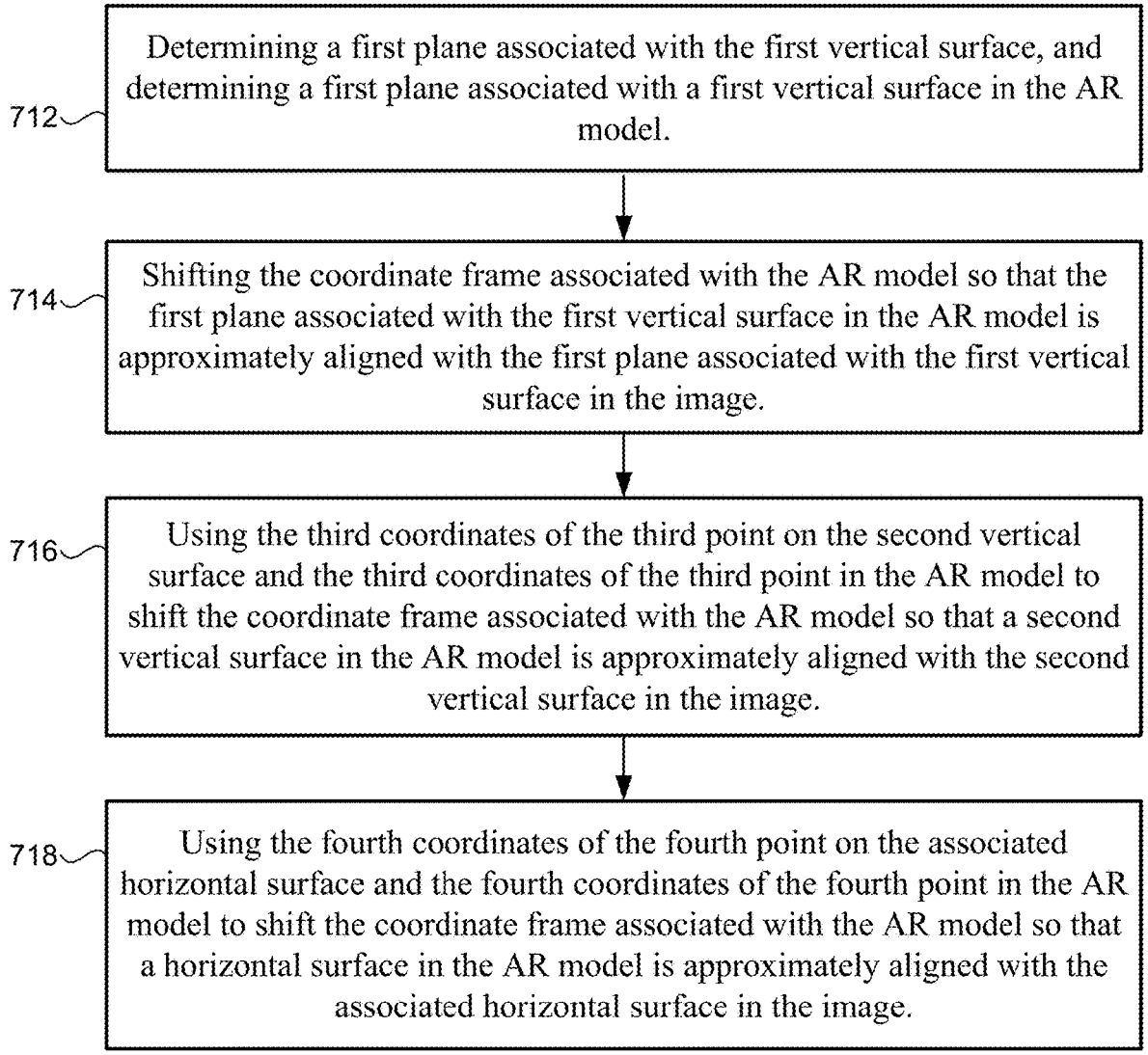

FIGS. 7A-7B are a flowchart of a method for positioning an AR model of a building or area of construction relative to an image of the building or area of construction as displayed on a handheld device, according to yet another embodiment of the present disclosure. This method aligns vertical surfaces of the AR model with vertical surfaces of the building or area of construction in the image and aligns a horizontal surface of the AR model with a horizontal surface of the building or area of construction in the image.

The method includes selecting the AR model of the building or area of construction on the handheld device (702). The AR model may be selected by a user, for example, by selecting a file associated with the AR model or selecting the particular model in an AR application running on the handheld device.

The AR model of the building or area of construction is positioned so that measurement beams pass through corresponding walls in the room and in the AR model (704). The AR model may be positioned inside the building or area of construction by moving the AR model of the building or area of construction relative to the image of the building or area of construction so that the vertical surfaces of the AR model are located between a position of the handheld device and the vertical surfaces of the building or area of construction in the image, and the horizontal surface of the AR model is located between the position of the handheld device and the associated horizontal surface of the building or area of construction in the image. Alternatively, the AR model may be positioned outside the building or area of construction, or partially inside and partially outside the building or area of construction, in a similar manner.

The method also includes performing a first distance measurement from the handheld device to a first point on a first vertical surface, a second distance measurement from the handheld device to a second point on the first vertical surface, a third distance measurement from the handheld device to a third point on a second vertical surface, and a fourth distance measurement from the handheld device to fourth point on the associated horizontal surface (706). The first vertical surface, the second vertical surface, and the associated horizontal surface are surfaces of the building or area of construction. The distance measurements are made using a distance measurement unit having a known spatial relationship with a camera of the handheld device. The first distance measurement is made while the handheld device is at a first position and orientation, the second distance measurement is made while the handheld device is at a second position and orientation, the third distance measurement is made while the handheld device is at a third position and orientation, and the fourth distance measurement is made while the handheld device is at a fourth position and orientation.

The method also includes determining, in a coordinate frame associated with the building or area of construction, first coordinates of the first point on the first vertical surface, second coordinates of the second point on the first vertical surface, third coordinates of the third point on the second vertical surface, and fourth coordinates of the fourth point on the associated horizontal surface (708). The first coordinates are determined using the first position and orientation and the first distance measurement, the second coordinates are determined using the second position and orientation and the second distance measurement, the third coordinates are determined using the third position and orientation and the third distance measurement, and the fourth coordinates are determined using the fourth position and orientation and the fourth distance measurement.

The method also includes determining, in a coordinate frame associated with the AR model, first coordinates of a first point in the AR model, second coordinates of a second point in the AR model, third coordinates of a third point in the AR model, and fourth coordinates of a fourth point in the AR model (710). The first coordinates of the first point in the AR model are at a point in the AR model located where a beam of the distance measurement unit intersects the AR model while performing the first distance measurement, the second coordinates of the second point in the AR model are at a point in the AR model located where the beam of the distance measurement unit intersects the AR model while performing the second distance measurement, the third coordinates of the third point in the AR model are at a point in the AR model located where the beam of the distance measurement unit intersects the AR model while performing the third distance measurement, and the fourth coordinates of the fourth point in the AR model are at a point in the AR model located where the beam of the distance measurement unit intersects the AR model while performing the fourth distance measurement. As explained above, the beam does not physically intersect the AR model, but the beam does extend from the handheld device through the measured points, and the beam will pass through a point of the AR model in the image depending on where the AR model is positioned.

A first plane associated with the first vertical surface is determined and a first plane associated with a first vertical surface in the AR model is determined (712). The first plane associated with the first vertical surface is aligned approximately with a gravity vector and passes through the first coordinates of the first point on the first vertical surface and the second coordinates of the second point on the first vertical surface. The first plane associated with the first vertical surface in the AR model is aligned approximately with the gravity vector and passes through the first coordinates of the first point in the AR model and the second coordinates of the second point in the AR model.

The coordinate frame associated with the AR model is shifted so that the first plane associated with the first vertical surface in the AR model is accurately aligned with the first plane associated with the first vertical surface in the image (714).

The third coordinates of the third point on the second vertical surface and the third coordinates of the third point in the AR model are used to shift the coordinate frame associated with the AR model so that a second vertical surface in the AR model is accurately aligned with the second vertical surface in the image (716).

The fourth coordinates of the fourth point on the associated horizontal surface and the fourth coordinates of the fourth point in the AR model are used to shift the coordinate frame associated with the AR model so that a horizontal surface in the AR model is accurately aligned with the associated horizontal surface in the image (718). As used herein, the surfaces in the AR model will be accurately aligned when they are within a few millimeters of the corresponding surfaces in the image.

Figure 8B:
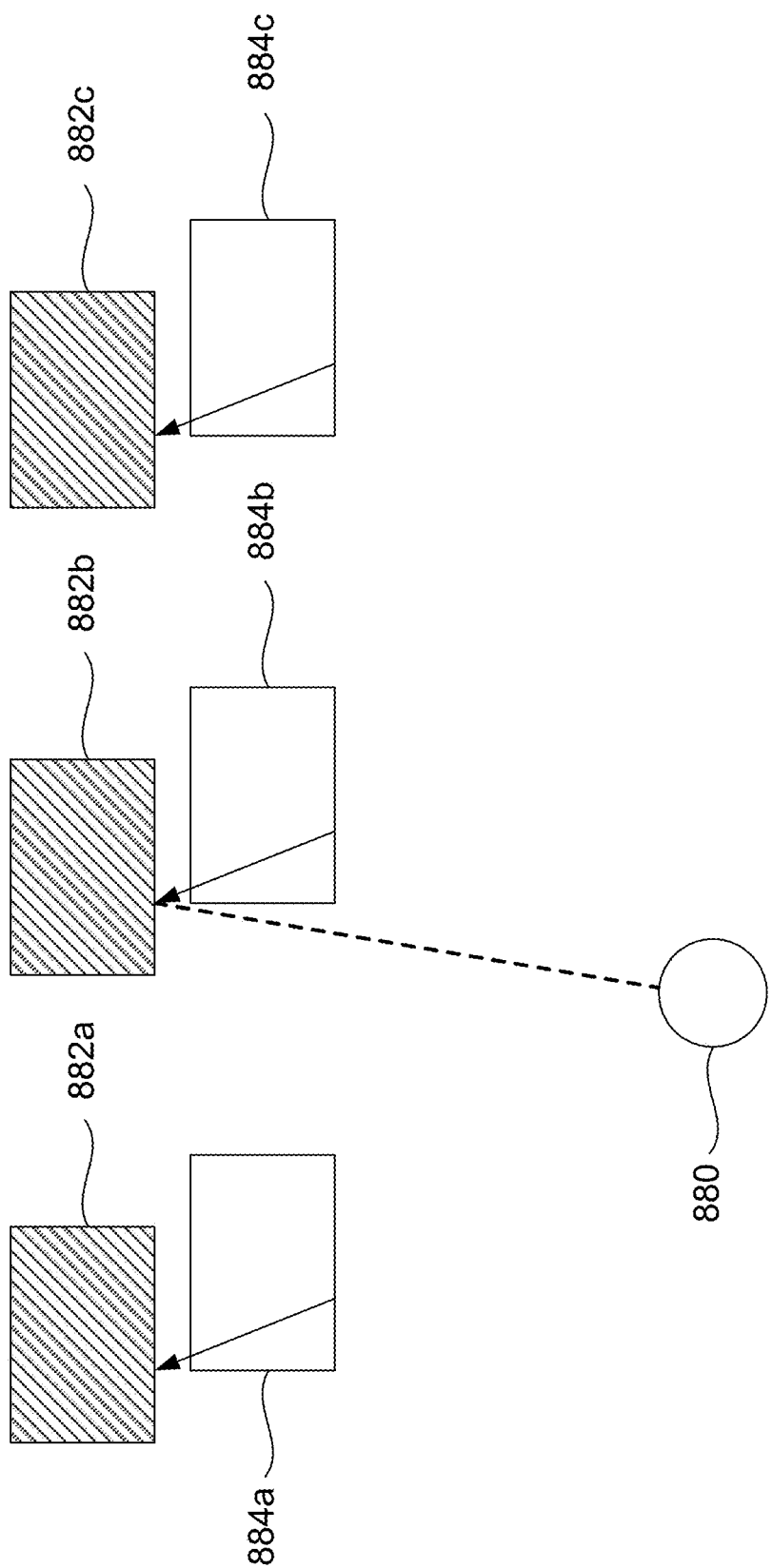

FIGS. 8A-8B are simplified drawings illustrating a method for updating a position of an AR model relative to surrounding objects, according to an embodiment of the present disclosure. This method can be used with any of the other methods described herein that align vertical and horizontal surfaces of an AR model with corresponding vertical and horizontal surfaces of a building or area of construction in an image. After surfaces of an AR model are aligned with corresponding surfaces in an image, the alignment can be maintained as a user moves around the building or area of construction using known motion tracking techniques. These techniques are susceptible to drift, and the method illustrated in FIGS. 8A-8B can be used to bring the AR model back into alignment.

FIG. 8A shows a handheld device at position 880 and columns 882a, 882b, 882c. The columns 882a, 882b, 882c each have similar features. A distance is measured from the position 880 to a point on column 882b. This is shown by the dashed line.

In some embodiments, the measured distance, the position 880, and an orientation of the handheld device at the time of the distance measurement are used to determine a horizontal distance between the position 880 and the column 882b. Objects that are within a threshold distance of the horizontal distance can be identified in the AR model. The threshold distance may be a fixed value or it may be determined based on an estimated rate of drift between the AR model and corresponding objects in the image and a period of time since the last update. If multiple objects are identified as being within the threshold distance, a user may choose the correct object associated with the distance measurement. This is shown in FIG. 8B, where AR object 884a is identified as the AR object corresponding to column 882b. A coordinate frame associated with the AR model is shifted to align the AR model with the measured object. This is shown by the arrows. Note that the method of measuring a distance to one column (882b) and aligning the corresponding AR object 884 can be used to align all objects in the AR model (i.e., 884a, 884b, 884c).

In other embodiments, the measured distance, the position 880, the orientation of the handheld device at the time of the distance measurement, and an azimuth of the handheld device at the time of the distance measurement are used to determine coordinates of the measured point on the column 882b in a coordinate frame associated with the building or area of construction. A corresponding object in the AR model that is within a threshold distance from the coordinates is identified as the AR object corresponding to column 882b. A coordinate frame associated with the AR model is shifted to align the AR model with the measured object. The threshold distance may be determined as described previously.

Figure 9:
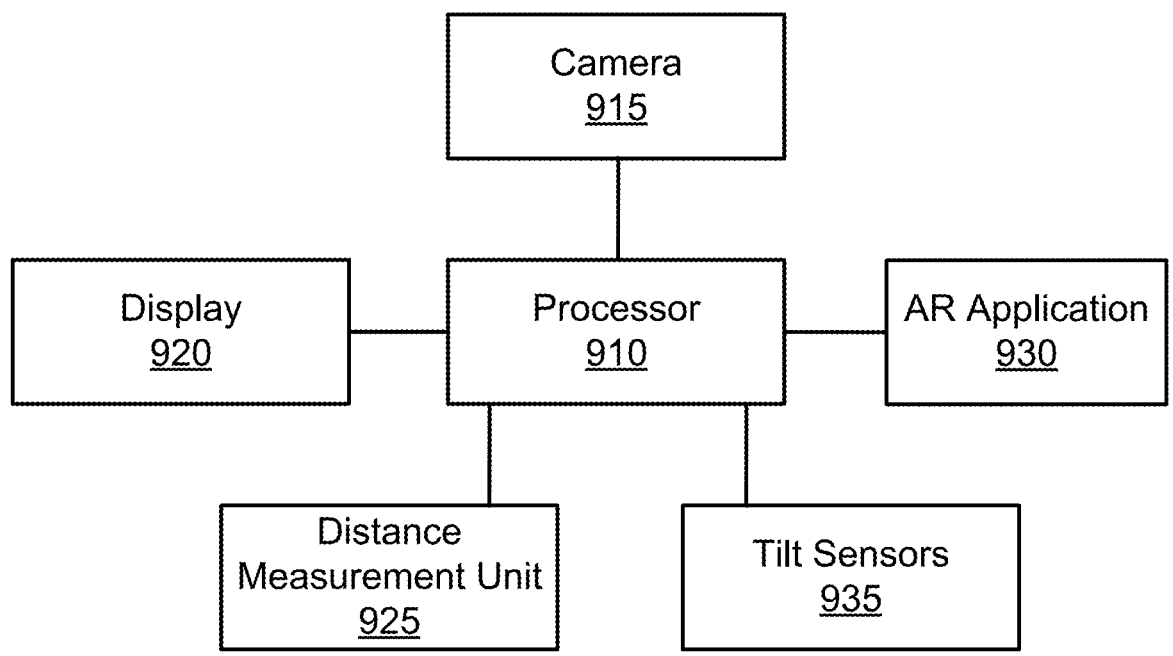
FIG. 9 is a simplified block diagram of an AR device, according to an embodiment of the present disclosure.

FIG. 9 is a simplified block diagram of an AR device, according to an embodiment of the present disclosure. The AR device is provided as an example, and the methods described herein can be executed on any handheld device including a mobile phone. Other devices may be configured differently than the example presented here. The handheld device in this example includes a processor 910, a camera 915, tilt sensors 935, a display 920, and an AR application 930. In some embodiments, the AR device may also include a distance measurement unit 925.

The processor 910 may include one or more general-purpose processors and/or one or more special-purpose processors such as digital signal processing chips, graphics acceleration processors, and/or the like. The camera 915 may include one or more digital video cameras configured to capture image information. The display 920 may be configured to display the image information captured by the camera 915. The distance measurement unit 925 may be an EDM or similar unit configured to measure distance between the AR device and objects in the surrounding environment. The tilt sensors 935 may include one or more inertial measurement units (IMUs) configured to provide tilt information that can be used to determine a vertical tilt of the AR device when making measurements with the distance measurement unit 925. The distance measurement unit 925 may have a known spatial relationship with the camera 915 so that distances between the camera and the objects in the surrounding environment can be determined.

The AR device can include software elements, including an operating system, device drivers, executable libraries, and/or other code, such as one or more AR applications 930, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by the processor 910.

A set of these instructions and/or code may be stored on a non-transitory computer-readable storage medium. It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a handheld device to perform methods in accordance with various embodiments of the technology. According to a set of embodiments, some or all of the procedures of such methods are performed by the handheld in response to processor 910 executing one or more sequences of one or more instructions, which might be incorporated into the operating system and/or other code, such as an AR application 930, which may be contained in working memory. Such instructions may be read into the working memory from another computer-readable medium, such as one or more storage devices. Merely by way of example, execution of the sequences of instructions contained in the working memory might cause the processors 910 to perform one or more procedures of the methods described herein. Additionally or alternatively, portions of the methods described herein may be executed through specialized hardware.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

What is claimed is:

1. A method for positioning an augmented reality (AR) model of a building or area of construction relative to an image of the building or area of construction as displayed on a handheld device so that vertical surfaces of the AR model are aligned with vertical surfaces of the building or area of construction and a horizontal surface of the AR model is aligned with an associated horizontal surface of the building or area of construction, the method comprising:
   identifying, using a plane detection function of the handheld device, a size and location of:
      a first vertical surface of the building or area of construction in the image of the building or area of construction displayed on the handheld device;
      a second vertical surface of the building or area of construction in the image of the building or area of construction displayed on the handheld device, wherein the second vertical surface of the building or area of construction intersects with the first vertical surface of the building or area of construction; and
      a horizontal surface of the building or area of construction in the image of the building or area of construction displayed on the handheld device, wherein the horizontal surface of the building or area of construction intersects with the first vertical surface of the building or area of construction and the second vertical surface of the building or area of construction;
   receiving, at a user interface of the handheld device, a selection of the AR model of the building or area of construction on the handheld device;
   receiving, at the user interface of the handheld device, selections of:
      a first vertical surface in the AR model that corresponds to the first vertical surface of the building or area of construction;
      a second vertical surface in the AR model that corresponds to the second vertical surface of the building or area of construction; and
      a horizontal surface in the AR model that corresponds to the horizontal surface of the building or area of construction;
   shifting the AR model as displayed on the handheld device so that:
      the display of the first vertical surface in the AR model accurately aligns with the first vertical surface of the building or area of construction in the image;
      the display of the second vertical surface in the AR model accurately aligns with the second vertical surface of the building or area of construction in the image; and
      the display of the horizontal surface in the AR model accurately aligns with the horizontal surface of the building or area of construction in the image; and
   displaying the AR model of the building or area of construction on the handheld device.

2. The method of claim 1 wherein the image of the building or area of construction as displayed on the handheld device comprises a plurality of images obtained using a camera.

3. The method of claim 1 further comprising:
   performing, using a distance measurement unit having a known spatial relationship with a camera of the handheld device, a first distance measurement from the handheld device to an object within the building or area of construction displayed in the image of the building or area of construction while the handheld device is at a first position and orientation;
   determining, in a coordinate frame associated with the building or area of construction, first coordinates of the object;
   identifying the object in the AR model using the first coordinates; and
   shifting a coordinate frame associated with the AR model so that a display of the object in the AR model accurately aligns with the object in the image.

4. The method of claim 3 wherein the object is identified in the AR model as being within a threshold distance of the first coordinates.

5. The method of claim 3 wherein identifying the object in the AR model comprises:
   determining a horizontal distance between the first position of the handheld device and the first coordinates using the first distance measurement and the first position and orientation of the handheld device; and
   identifying objects in the AR model that are at the horizontal distance plus or minus a predetermined threshold distance from the first position of the handheld device.

6. The method of claim 3 wherein identifying the object in the AR model comprises:
   determining a heading of the camera in the coordinate frame associated with the building or area of construction while the handheld device is at the first position and orientation; and
   identifying the object in the AR model based on the heading of the camera, the first distance measurement, and the first position and orientation of the handheld device.

7. A method for positioning an augmented reality (AR) model of a building or area of construction relative to an image of the building or area of construction as displayed on a handheld device so that vertical surfaces of the AR model are aligned with vertical surfaces of the building or area of construction and a horizontal surface of the AR model is aligned with an associated horizontal surface of the building or area of construction, the method comprising:
   performing, using a distance measurement unit having a known spatial relationship with a camera of the handheld device:
      a first distance measurement from the handheld device to a first point on a first vertical surface of the building or area of construction displayed in the image of the building or area of construction;
      a second distance measurement from the handheld device to a second point on a second vertical surface of the building or area of construction displayed in the image of the building or area of construction, wherein the first vertical surface of the building or area of construction and the second vertical surface of the building or area of construction intersect at a right angle; and a third distance measurement from the handheld device to a third point on a horizontal surface of the building or area of construction displayed in the image of the building or area of construction, wherein the horizontal surface of the building or area of construction intersects with the first vertical surface of the building or area of construction and the second vertical surface of the building or area of construction;

receiving, at a user interface of the handheld device, a selection of the AR model of the building or area of construction on the handheld device;

identifying in the AR model:
a first vertical surface in the AR model that corresponds to the first vertical surface of the building or area of construction;
a second vertical surface in the AR model that corresponds to the second vertical surface of the building or area of construction; and a horizontal surface in the AR model that corresponds to the horizontal surface of the building or area of construction; and shifting, using the first distance measurement, the second distance measurement, and the third distance measurement, the AR model as displayed on the handheld device so that:
the display of the first vertical surface in the AR model accurately aligns with the first vertical surface of the building or area of construction in the image;
the display of the second vertical surface in the AR model accurately aligns with the second vertical surface of the building or area of construction in the image; and
the display of the horizontal surface in the AR model accurately aligns with the horizontal surface of the building or area of construction in the image; and displaying the AR model of the building or area of construction on the handheld device.

8. The method of claim 7 further comprising:
determining a first horizontal distance between the handheld device and the first point using the first distance measurement;
determining a second horizontal distance between the handheld device and the second point using the second distance measurement; and
determining a third vertical distance between the handheld device and the third point using the third distance measurement, wherein the AR model is shifted using the first horizontal distance, the second horizontal distance, and the third vertical distance.

9. The method of claim 7 wherein the first distance measurement is obtained while the handheld device is at a first position and orientation, the second distance measurement is obtained while the handheld device is at a second position and orientation, and the third distance measurement is obtained while the handheld device is at a third position and orientation, and wherein shifting the AR model so that the display of the horizontal surface in the AR model accurately aligns with the horizontal surface of the building or area of construction in the image includes determining a vertical distance between the handheld device and the third point based on the third position and orientation of the handheld device.

10. The method of claim 7 wherein the first vertical surface in the AR model, the second vertical surface in the AR model, and the horizontal surface in the AR model are identified in the image based on user input.

11. The method of claim 7 further comprising:
performing, using the distance measurement unit, a fourth distance measurement from the handheld device to an object within the building or area of construction while the handheld device is at a fourth position and orientation;
determining, in a coordinate frame associated with the building or area of construction, fourth coordinates of the object;
identifying the object in the AR model using the fourth coordinates; and
shifting a coordinate frame associated with the AR model so that the display of the object in the AR model accurately aligns with the object in the image.

12. The method of claim 11 wherein the object is identified in the AR model as being within a threshold distance of the fourth coordinates.

13. The method of claim 11 wherein identifying the object in the AR model comprises:
determining a horizontal distance between the fourth position of the handheld device and the fourth coordinates using the fourth distance measurement and the fourth position and orientation of the handheld device; and
identifying objects in the AR model that are at the horizontal distance plus or minus a predetermined threshold distance from the fourth position of the handheld device.

14. The method of claim 11 wherein identifying the object in the AR model comprises:
determining a heading of the camera in the coordinate frame associated with the building or area of construction while the handheld device is at the fourth position and orientation; and
identifying the object in the AR model based on the heading of the camera, the fourth distance measurement, and the fourth position and orientation of the handheld device.

15. A method for positioning an augmented reality (AR) model of a building or area of construction relative to an image of the building or area of construction as displayed on a handheld device so that vertical surfaces of the AR model are aligned with vertical surfaces of the building or area of construction and a horizontal surface of the AR model is aligned with an associated horizontal surface of the building or area of construction, the method comprising:
receiving, at a user interface of the handheld device, a selection of the AR model of the building or area of construction on the handheld device;
positioning the AR model of the building or area of construction relative to the building or area of construction displayed on the handheld device by performing at least one of:
moving the AR model of the building or area of construction relative to the image of the building or area of construction so that the display of the vertical surfaces of the AR model are located between a position of the handheld device and the vertical surfaces of the building or area of construction in the image, and the display of the horizontal surface of the AR model is located between the position of the handheld device and the associated horizontal surface of the building or area of construction in the image;

moving the AR model of the building or area of construction relative to the image of the building or area of construction so that the display of the vertical surfaces of the AR model are located behind the vertical surfaces of the building or area of construction in the image, and the display of the horizontal surface of the AR model is located under the associated horizontal surface of the building or area of construction in the image; or moving the AR model of the building or area of construction relative to the image of the building or area of construction so that the display of at least a portion of the vertical surfaces of the AR model are located between a position of the handheld device and the vertical surfaces of the building or area of construction in the image, and/or the display of at least a portion of the horizontal surface of the AR model is located between the position of the handheld device and the associated horizontal surface of the building or area of construction in the image;

performing, using a distance measurement unit having a known spatial relationship with a camera of the handheld device:

a first distance measurement from the handheld device to a first point on a first vertical surface of the building or area of construction while the handheld device is at a first position and orientation;

a second distance measurement from the handheld device to a second point on the first vertical surface of the building or area of construction while the handheld device is at a second position and orientation;

a third distance measurement from the handheld device to a third point on a second vertical surface of the building or area of construction while the handheld device is at a third position and orientation, wherein the second vertical surface of the building or area of construction intersects with the first vertical surface of the building or area of construction; and a fourth distance measurement from the handheld device to a fourth point on the associated horizontal surface of the building or area of construction while the handheld device is at a fourth position and orientation, wherein the associated horizontal surface of the building or area of construction intersects with the first vertical surface of the building or area of construction and the second vertical surface of the building or area of construction;

determining, in a coordinate frame associated with the building or area of construction:

first coordinates of the first point on the first vertical surface using the first position and orientation and the first distance measurement;

second coordinates of the second point on the first vertical surface using the second position and orientation and the second distance measurement;

third coordinates of the third point on the second vertical surface using the third position and orientation and the third distance measurement; and fourth coordinates of the fourth point on the associated horizontal surface using the fourth position and orientation and the fourth distance measurement;

determining, in a coordinate frame associated with the AR model:

first coordinates of a first point in the AR model, the first point in the AR model located where a beam of the distance measurement unit intersects the AR model while performing the first distance measurement;

second coordinates of a second point in the AR model, the second point in the AR model located where the beam of the distance measurement unit intersects the AR model while performing the second distance measurement;

third coordinates of a third point in the AR model, the third point in the AR model located where the beam of the distance measurement unit intersects the AR model while performing the third distance measurement; and fourth coordinates of a fourth point in the AR model, the fourth point in the AR model located where the beam of the distance measurement unit intersects the AR model while performing the fourth distance measurement;

determining a first plane associated with the first vertical surface, the first plane associated with the first vertical surface aligned approximately with a gravity vector and passing through the first coordinates of the first point on the first vertical surface and the second coordinates of the second point on the first vertical surface;

determining a first plane associated with a first vertical surface in the AR model, the first plane associated with the first vertical surface in the AR model aligned approximately with the gravity vector and passing through the first coordinates of the first point in the AR model and the second coordinates of the second point in the AR model;

shifting the coordinate frame associated with the AR model so that the first plane associated with the first vertical surface in the AR model is accurately aligned with the first plane associated with the first vertical surface in the image;

using the third coordinates of the third point on the second vertical surface and the third coordinates of the third point in the AR model to shift the coordinate frame associated with the AR model so that a second vertical surface in the AR model is accurately aligned with the second vertical surface in the image; and using the fourth coordinates of the fourth point on the associated horizontal surface and the fourth coordinates of the fourth point in the AR model to shift the coordinate frame associated with the AR model so that a horizontal surface in the AR model is accurately aligned with the associated horizontal surface in the image.

16. The method of claim 15 wherein the image of the building or area of construction as displayed on the handheld device comprises a plurality of images obtained using the camera.

17. The method of claim 15 further comprising:

performing, using the distance measurement unit, a fifth distance measurement from the handheld device to an object within the building or area of construction while the handheld device is at a fifth position and orientation;

determining, in the coordinate frame associated with the building or area of construction, fifth coordinates of the object;

identifying the object in the AR model using the fifth coordinates; and shifting the coordinate frame associated with the AR model so that a display of the object in the AR model accurately aligns with the object in the image.

18. The method of claim 17 wherein identifying the object in the AR model comprises:
   determining a horizontal distance between the fifth position of the handheld device and the fifth coordinates using the fifth distance measurement and the fifth position and orientation of the handheld device; and
   identifying objects in the AR model that are at the horizontal distance plus or minus a predetermined threshold distance from the fifth position of the handheld device.

19. The method of claim 17 wherein identifying the object in the AR model comprises:
   determining a heading of the camera in the coordinate frame associated with the building or area of construction while the handheld device is at the fifth position and orientation; and
   identifying the object in the AR model based on the heading of the camera, the fifth distance measurement, and the fifth position and orientation of the handheld device.

20. A method for aligning an augmented reality (AR) model of a building relative to the building on a handheld device, the method comprising:
   capturing, by a camera of the handheld device, one or more images of the building;
   displaying, at a display of the handheld device, the one or more images of the building;
   detecting, from the one or more images using a plane detection function of the handheld device,
      a first vertical surface of the building;
      a second vertical surface of the building that intersects the first vertical surface of the building; and
      a horizontal surface of the building that intersects the first vertical surface and the second vertical surface of the building;
   identifying, by the handheld device, in a coordinate frame associated with the building,
      a first location in the one or more images for the first vertical surface of the building using a first horizontal distance between the handheld device and the first vertical surface of the building;
      a second location in the one or more images for the second vertical surface of the building using a second horizontal distance between the handheld device and the second vertical surface of the building; and
      a third location in the one or more images for the horizontal surface of the building using a vertical distance between the handheld device and the horizontal surface of the building;
   receiving, at a user interface of the handheld device, a selection of the AR model of the building;
   receiving, at the user interface of the handheld device, selections of:
      a first vertical surface in the AR model of the building;
      a second vertical surface in the AR model of the building that intersects with the first vertical surface in the AR model of the building; and
      a horizontal surface in the AR model of the building that intersects with the first vertical surface and the second vertical surface in the AR model of the building;
   generating, by the handheld device in response to receiving the selections of the first vertical surface, the second vertical surface, and the horizontal surface in the AR model of the building,
      a first association between the first vertical surface in the AR model of the building and the first vertical surface of the building;
      a second association between the second vertical surface in the AR model of the building and the second vertical surface of the building; and
      a third association between the horizontal surface in the AR model of the building and the horizontal surface of the building;
   displaying the AR model of the building at the display of the handheld device; and
   aligning, by the handheld device, a coordinate frame associated with the AR model with the coordinate frame associated with the building so that:
      the first vertical surface in the AR model is displayed at the first location in the one or more images for the first vertical surface of the building;
      the second vertical surface in the AR model is displayed at the second location in the one or more images for the second vertical surface of the building; and
      the horizontal surface in the AR model is displayed at the third location in the one or more images for the horizontal surface of the building;
   wherein the coordinate frame associated with the AR model is aligned with the coordinate frame associated with the building using the first association, the second association, and the third association generated in response to receiving the selections of the first vertical surface, the second vertical surface, and the horizontal surface in the AR model of the building.

* * * * *